United States Patent
Katz et al.

(10) Patent No.: US 7,099,013 B2
(45) Date of Patent: *Aug. 29, 2006

(54) SYSTEM AND METHOD OF BROAD BAND OPTICAL END POINT DETECTION FOR FILM CHANGE INDICATION

(75) Inventors: Vladimir Katz, Fremont, CA (US); Bella Mitchell, Danville, CA (US)

(73) Assignee: Lam Research Corporation, Fremont, CA (US)

( * ) Notice: Subject to any disclaimer, the term of this patent is extended or adjusted under 35 U.S.C. 154(b) by 326 days.

This patent is subject to a terminal disclaimer.

(21) Appl. No.: 10/721,136

(22) Filed: Nov. 24, 2003

(65) Prior Publication Data

US 2004/0165177 A1    Aug. 26, 2004

Related U.S. Application Data

(63) Continuation-in-part of application No. 10/112,425, filed on Mar. 29, 2002, now Pat. No. 6,806,948.

(51) Int. Cl.
  *G01N 21/55* (2006.01)
  *G01N 21/00* (2006.01)

(52) U.S. Cl. ............... 356/445; 356/72; 356/73

(58) Field of Classification Search ........... None
See application file for complete search history.

(56) References Cited

U.S. PATENT DOCUMENTS

| | | | |
|---|---|---|---|
| 5,271,274 A | 12/1993 | Khuri-Yakub et al. | |
| 5,398,243 A | 3/1995 | Aguilhon et al. | |
| 5,433,651 A | 7/1995 | Lustig et al. | |
| 6,077,452 A | 6/2000 | Litvak | |
| 6,106,662 A | 8/2000 | Bibby, Jr. et al. | |
| 6,186,865 B1 | 2/2001 | Thornton et al. | |
| 6,806,948 B1 * | 10/2004 | Katz et al. ............ | 356/72 |

FOREIGN PATENT DOCUMENTS

EP    739687 A2    10/1996

* cited by examiner

*Primary Examiner*—Michael P. Stafira
(74) *Attorney, Agent, or Firm*—Martine Penilla & Gencarella, LLP

(57) ABSTRACT

A system and method for detecting an endpoint is disclosed that includes illuminating a first portion of a surface of a wafer with a first broad beam of light. A first reflected spectrum data is received. The first reflected spectrum of data corresponds to a first spectra of light reflected from the first illuminated portion of the surface of the wafer. A second portion of the surface of the wafer with a second broad beam of light. A second reflected spectrum data is received. The second reflected spectrum of data corresponds to a second spectra of light reflected from the second illuminated portion of the surface of the wafer. The first reflected spectrum data is normalized and the second reflected spectrum data is normalized. An endpoint is determined based on a difference between the normalized first spectrum data and the normalized second spectrum data.

12 Claims, 20 Drawing Sheets

SYSTEM AND METHOD OF BROAD BAND OPTICAL END POINT DETECTION FOR FILM CHANGE INDICATION

CROSS REFERENCE TO RELATED APPLICATIONS

This application is a continuation-in-part of and claims priority from U.S. patent application Ser. No. 10/112,425 filed on Mar. 29, 2002 now U.S. Pat. No. 6,806,948 entitled "System and Method of Broad Band Optical End Point Detection for Film Change Indication," which is incorporated herein by reference in its entirety.

BACKGROUND OF THE INVENTION

1. Field of the Invention

This invention relates generally to endpoint detection in a chemical mechanical polishing process, and more particularly to endpoint detection using optical interference of a broad reflectance spectrum.

2. Description of the Related Art

In the fabrication of semiconductor devices, typically, the integrated circuit devices are in the form of multi-level structures. At the substrate level, transistor devices having diffusion regions are formed. In subsequent levels, interconnect metallization lines are patterned and electrically connected to the transistor devices to define the desired functional device. As is well known, patterned conductive layers are insulated from other conductive layers by dielectric materials, such as silicon dioxide. As more metallization levels and associated dielectric layers are formed, the need to planarize the dielectric material increases. Without planarization, fabrication of additional metallization layers becomes substantially more difficult due to the higher variations in the surface topography. In other applications, metallization line patterns are formed in the dielectric material, and then metal chemical mechanical polishing (CMP) operations are performed to remove excess metallization.

In the prior art, CMP systems typically implement belt, orbital, or brush stations in which belts, pads, or brushes are used to scrub, buff, and polish one or both sides of a wafer. Slurry is used to facilitate and enhance the CMP operation. Slurry is most usually introduced onto a moving preparation surface, e.g., belt, pad, brush, and the like, and distributed over the preparation surface as well as the surface of the semiconductor wafer being buffed, polished, or otherwise prepared by the CMP process. The distribution is generally accomplished by a combination of the movement of the preparation surface, the movement of the semiconductor wafer and the friction created between the semiconductor wafer and the preparation surface.

FIG. 1A shows a cross sectional view of a dielectric layer 102 undergoing a fabrication process that is common in constructing damascene and dual damascene interconnect metallization lines. The dielectric layer 102 has a diffusion barrier layer 104 deposited over the etch-patterned surface of the dielectric layer 102. The diffusion barrier layer, as is well known, is typically titanium nitride (TiN), tantalum (Ta), tantalum nitride (TaN) or a combination of tantalum nitride (TaN) and tantalum (Ta). Once the diffusion barrier layer 104 has been deposited to the desired thickness, a copper layer 106 is formed over the diffusion barrier layer in a way that fills the etched features in the dielectric layer 102. Some excessive diffusion barrier and metallization material is also inevitably deposited over the field areas. In order to remove these overburden materials and to define the desired interconnect metallization lines and associated vias (not shown), a chemical mechanical planarization (CMP) operation is performed.

As mentioned above, the CMP operation is designed to remove the top metallization material from over the dielectric layer 102. For instance, as shown in FIG. 1B, the overburden portion of the copper layer 106 and the diffusion barrier layer 104 have been removed. As is common in CMP operations, the CMP operation must continue until all of the overburden metallization and diffusion barrier material 104 is removed from over the dielectric layer 102. However, in order to ensure that all the diffusion barrier layer 104 is removed from over the dielectric layer 102, there needs to be a way of monitoring the process state and the state of the wafer surface during its CUT processing. This is commonly referred to as endpoint detection. Endpoint detection for copper is performed because copper cannot be successfully polished using a timed method. A timed polish does not work with copper because the removal rate from a CMP process is not stable enough for a timed polish of a copper layer. The removal rate for copper from a CMP process varies greatly. Hence, monitoring is needed to determine when the endpoint has been reached. In multi-step CMP operations there is a need to ascertain multiple endpoints: (1) to ensure that Cu is removed from over the diffusion barrier layer; (2) to ensure that the diffusion barrier layer is removed from over the dielectric layer. Thus, endpoint detection techniques are used to ensure that all of the desired overburden material is removed.

Many approaches have been proposed for the endpoint detection in CMP of metal. The prior art methods generally can be classified as direct and indirect detection of the physical state of polish. Direct methods use an explicit external signal source or chemical agent to probe the wafer state during the polish. The indirect methods on the other hand monitor the signal internally generated within the tool due to physical or chemical changes that occur naturally during the polishing process.

Indirect endpoint detection methods include monitoring: the temperature of the polishing pad/wafer surface, vibration of polishing tool, frictional forces between the pad and the polishing head, electrochemical potential of the slurry, and acoustic emission. Temperature methods exploit the exothermic process reaction as the polishing slurry reacts selectively with the metal film being polished. U.S. Pat. No. 5,643,050 is an example of this approach. U.S. Pat. No. 5,643,050 and U.S. Pat. No. 5,308,438 disclose friction-based methods in which motor current changes are monitored as different metal layers are polished.

Another endpoint detection method disclosed in European application EP 0 739 687 A2 demodulates the acoustic emission resulting from the grinding process to yield information on the polishing process. Acoustic emission monitoring is generally used to detect the metal endpoint. The method monitors the grinding action that takes place during polishing. A microphone is positioned at a predetermined distance from the wafer to sense acoustical waves generated when the depth of material removal reaches a certain determinable distance from the interface to thereby generate output detection signals. All these methods provide a global measure of the polish state and have a strong dependence on process parameter settings and the selection of consumables. However, none of the methods except for the friction sensing have achieved some commercial success in the industry.

Direct endpoint detection methods monitor the wafer surface using acoustic wave velocity, optical reflectance and interference, impedance/conductance, electrochemical potential change due to the introduction of specific chemical agents. U.S. Pat. No. 5,399,234 and U.S. Pat. No. 5,271,274 disclose methods of endpoint detection for metal using acoustic waves. These patents describe an approach to monitor the acoustic wave velocity propagated through the wafer/slurry to detect the metal endpoint. When there is a transition from one metal layer into another, the acoustic wave velocity changes and this has been used for the detection of endpoint. Further, U.S. Pat. No. 6,186,865 discloses a method of endpoint detection using a sensor to monitor fluid pressure from a fluid bearing located under the polishing pad. The sensor is used to detect a change in the fluid pressure during polishing, which corresponds to a change in the shear force when polishing transitions from one material layer to the next. Unfortunately, this method is not robust to process changes. Further, the endpoint detected is global, and thus the method cannot detect a local endpoint at a specific point on the wafer surface. Moreover, the method of the U.S. Pat. No. 6,186,865 patent is restricted to a linear polisher, which requires an air bearing.

There have been many proposals to detect the endpoint using the optical reflectance from the wafer surface. They can be grouped into two categories: monitoring the reflected optical signal at a single wavelength using a laser source or using a broad band light source covering the full visible range of the electromagnetic spectrum. U.S. Pat. No. 5,433,651 discloses an endpoint detection method using a single wavelength in which an optical signal from a laser source is impinged on the wafer surface and the reflected signal is monitored for endpoint detection. The change in the reflectivity as the polish transfers from one metal to another is used to detect the transition.

Broad band methods typically rely on using information in multiple wavelengths of the electromagnetic spectrum. U.S. Pat. No. 6,106,662 discloses using a spectrometer to acquire an intensity spectrum of reflected light in the visible range of the optical spectrum. Two bands of wavelengths are selected in the spectra that provide good sensitivity to reflectivity change as polish transfers from one metal to another. A detection signal is then defined by computing the ratio of the average intensity in the two bands selected. Significant shifts in the detection signal indicate the transition from one metal to another.

A common problem with current endpoint detection techniques is that some degree of over-polishing is required to ensure that all of the conductive material (e.g., metallization material or diffusion barrier layer 104) is removed from over the dielectric layer 102 to prevent inadvertent electrical interconnection between metallization lines. A side effect of improper endpoint detection or over-polishing is that dishing 108 occurs over the metallization layer that is desired to remain within the dielectric layer 102. The dishing effect essentially removes more metallization material than desired and leaves a dish-like feature over the metallization lines. Dishing is known to impact the performance of the interconnect metallization lines in a negative way, and too much dishing can cause a desired integrated circuit to fail for its intended purpose.

Prior art methods typically can only approximately predict the actual end point but cannot actually detect the actual end point. The prior art detects when the intensity of a few wavelengths change, such as occurs when a material becomes translucent (e.g., the material becomes substantially transparent to some wavelengths but not all wavelengths). When the material becomes translucent, the intensities of some wavelengths change because those wavelengths are being reflected by the layer below the material currently being removed.

Because the event actually detected by the prior art process is when the layer being removed (such as a metal layer) becomes translucent rather than nonexistent (i.e., fully removed), the prior art process must then predict an actual end point (i.e., when all of the desired material is actually fully removed). In one example, the actual event detected, the translucent point, occurs when the material is 500 Å thick. From previous processes, the CMP process is known to be removing material at a rate of 3000 Å per minute. Therefore, the actual end point is predicted by the Formula 1 below:

Formula 1: (translucent material thickness)/(material removal rate)=time delay to predicted end point In current example: (500 Å)/(3000 Å/minute)=10 seconds Therefore, the prior art CMP process then continues the CMP removal process for an additional 10 seconds after the actual detection event occurs. Further, this time delay is calculated based on prior experience and also assumes a constant removal rate.

In view of the foregoing, there is a need for endpoint detection systems and methods that improve accuracy in endpoint detection.

SUMMARY OF THE INVENTION

Broadly speaking, the present invention fills these needs by providing a system and method of broad band optical end point detection. It should be appreciated that the present invention can be implemented in numerous ways, including as a process, an apparatus, a system, computer readable media, or a device. Several inventive embodiments of the present invention are described below.

A method for detecting an endpoint is disclosed that includes illuminating a first portion of a surface of a wafer with a first broad beam of light. A first reflected spectrum data is received. The first reflected spectrum of data corresponds to a first spectra of light reflected from the first illuminated portion of the surface of the wafer. A second portion of the surface of the wafer is illuminated with a second broad beam of light. A second reflected spectrum data is received. The second reflected spectrum of data corresponds to a second spectra of light reflected from the second illuminated portion of the surface of the wafer. The first reflected spectrum data is normalized and the second reflected spectrum data is normalized. An endpoint is determined based on a difference between the normalized first spectrum data and the normalized second spectrum data.

In one embodiment, the first spectrum data includes an intensity level corresponding to each of the wavelengths in the corresponding first spectra. In one embodiment, the second spectrum data includes an intensity level corresponding to each of the wavelengths in the corresponding second spectra.

In one embodiment, the wavelengths in the first spectra and the second spectra can include a range of about 300 nm to about 720 nm. In one embodiment the first spectra and the second spectra can include a range of about 200 to about 520 individual data points.

In one embodiment, normalizing the first spectrum data includes substantially removing the process related intensity fluctuations which are removed by substantially removing the corresponding intensity values. In one embodiment, normalizing the second spectrum data includes substantially removing the process related intensity fluctuations which are removed by substantially removing the corresponding intensity values.

In one embodiment, substantially removing the corresponding intensity values can include modifying the intensity values of each one of the wavelengths such that the sum the intensity values of each one of the wavelengths is equal to zero and the sum of the squares of the intensity values of each one of the wavelengths is equal to one.

In one embodiment, determining the endpoint based on the difference between the normalized first spectrum data and the normalized second spectrum data can include determining a change in the proportions of normalized intensity for at least a portion of the plurality of wavelengths in the first spectra and the second spectra.

In one embodiment, determining the change in the proportions of normalized intensity for at least a portion of the wavelengths in the first spectra and the second spectra can include converting the normalized first spectrum data into a first vector and converting the normalized second spectrum data into a second vector. A distance between the first vector and the second vector can be calculated. The distance between the first vector and the second vector can be compared to a threshold distance and if the distance between the first and second vectors is greater than or equal to a threshold distance, then a change in the proportions of normalized intensity for at least a portion of the plurality of wavelengths in the first spectra and the second spectra is identified.

Another embodiment can include a plasma etch system that includes a broadband light source for illuminating a portion of a surface of a wafer for multiple shots. An optical detector for receiving reflected spectrum data corresponding to multiple spectrums of light reflected from the illuminated portion of the surface of the wafer for each of the shots. Logic for normalizing a first reflected spectrum data corresponding to a first shot is also included. Logic for normalizing a second reflected spectrum data corresponding to a second shot and logic for determining an endpoint based on a difference between the normalized first spectrum data and the normalized second spectrum data are also included.

The logic for determining the endpoint based on the difference between the normalized first spectrum data and the normalized second spectrum data can include logic for determining a change in the proportions of intensity for at least a portion of the wavelengths in the first spectra and the second spectra. Determining the change in the proportions of intensity for at least a portion of the wavelengths in the first spectra and the second spectra can include logic for converting the normalized first spectrum data into a first vector, logic for converting the normalized second spectrum data into a second vector, logic for calculating a distance between the first vector and the second vector, logic for determining if the distance between the first and second vectors is greater than or equal to a threshold distance, and logic for identifying a change in the proportions of intensity for at least a portion of the wavelengths in the first spectra and the second spectra, if the distance between the first and second vectors is greater than or equal to the threshold distance.

Another embodiment is a system of detecting an endpoint. The system includes a broad band light source for illuminating a portion of a surface of a wafer for multiple shots. An optical detector for receiving reflected spectrum data corresponding to multiple spectrums of light reflected from the illuminated portion of the surface of the wafer for each of the shots is also included. Logic for normalizing a first reflected spectrum data corresponding to a first shot and logic for normalizing a second reflected spectrum data corresponding to a second shot and logic for determining an endpoint based on a difference between the normalized first spectrum data and the normalized second spectrum data are also included.

The logic for determining the endpoint based on the difference between the normalized first spectrum data and the normalized second spectrum data can include logic for determining a change in the proportions of intensity for at least a portion of the wavelengths in the first spectra and the second spectra. Determining the change in the proportions of intensity for at least a portion of the plurality of wavelengths in the first spectra and the second spectra can include logic for converting the normalized first spectrum data into a first vector, logic for converting the normalized second spectrum data into a second vector, logic for calculating a distance between the first vector and the second vector, logic for determining if the distance between the first and second vectors is greater than or equal to a threshold distance, and logic for identifying a change in the proportions of intensity for at least a portion of the wavelengths in the first spectra and the second spectra, if the distance between the first and second vectors is greater than or equal to the threshold distance.

The first spectrum data can include an intensity level corresponding to each of multiple wavelengths in the corresponding first spectra. The multiple wavelengths in the corresponding first spectra can include a range of about 300 nm to about 720 nm. The multiple wavelengths in the corresponding first spectra include a range of about 200 to about 520 individual data points.

The logic for normalizing the first spectrum data includes logic for substantially removing the corresponding intensity values. The logic for substantially removing the corresponding intensity values includes logic for modifying the intensity values of each one of the wavelengths such that the sum the intensity values of each one of the wavelengths is equal to zero the sum of the squares of the intensity values of each one of the wavelengths is equal to one. The system of detecting an endpoint can also be included in a proximity processing head.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

Figure 1A:
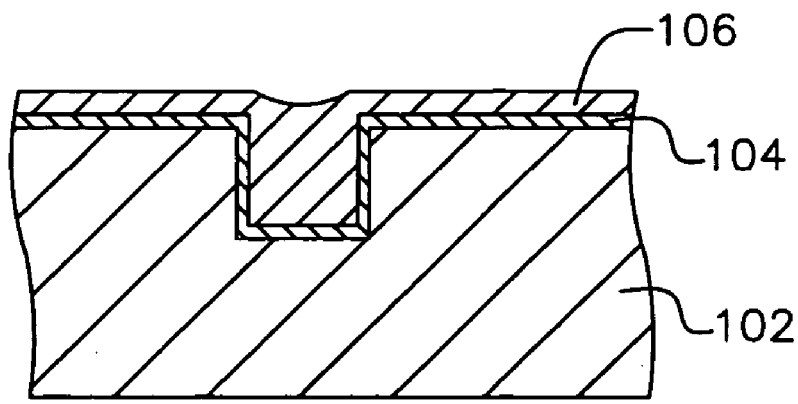
FIGS. 1A and 1B show a cross sectional view of a dielectric layer undergoing a fabrication process that is common in constructing damascene and dual damascene interconnect metallization lines.
Figure 1B:
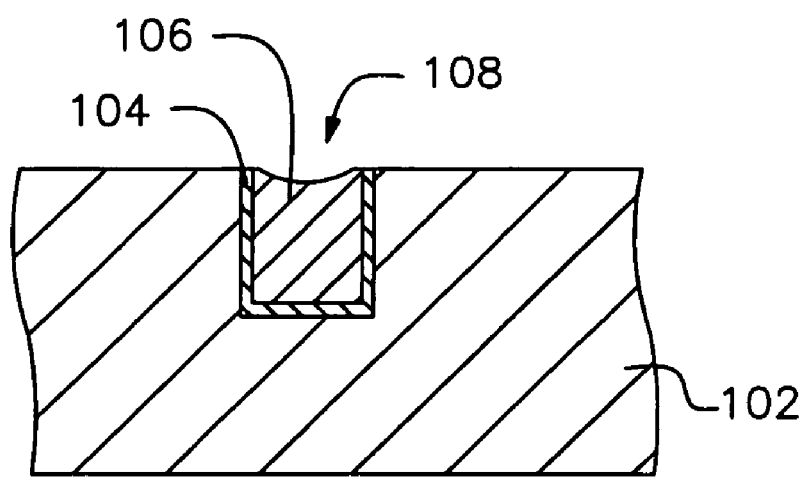

Several exemplary embodiments for optically determining an endpoint will now be described. It will be apparent to those skilled in the art that the present invention may be practiced without some or all of the specific details set forth herein.

An important control aspect of the chemical mechanical polishing (CMP) system is determining when the process is at an end, i.e., when to stop the CMP process. Prior art systems described above, typically predict and endpoint based on various detected data points but cannot accurately detect an exact endpoint as will be described in more detail below.

While the various embodiments of endpoint detection systems and methods that are discussed herein are described in an exemplary application of a CMP processes and CMP systems, it should be understood that the endpoint detection systems and methods can be applied in any other type of system or method. By way of example, the endpoint detection methods and systems described herein can be used in a stand-alone system that can be used in conjunction with any process or system. Further, the endpoint detection methods and systems described herein can be used in a proximity head systems and methods such as described in co-owned U.S. patent application Ser. No. 10/330,843 filed on Dec. 24, 2002 and entitled "Meniscus, Vacuum, IPA Vapor, Drying Manifold," which is a continuation-in-part of co-pending U.S. patent application Ser. No. 10/261,839 filed on Sep. 30, 2002 and entitled "Method and Apparatus for Drying Semiconductor Wafer Surfaces Using a Plurality of Inlets and Outlets Held in Close Proximity to the Wafer Surfaces," both of which are incorporated herein by reference in its entirety. Additional embodiments and uses of the proximity head are also disclosed in U.S. patent application Ser. No. 10/330,897, filed on Dec. 24, 2002, entitled "System for Substrate Processing with Meniscus, Vacuum, EPA vapor, Drying Manifold" and U.S. patent application Ser. No. 10/404,692, filed on Mar. 31, 2003, entitled "Methods and Systems for Processing a Substrate Using a Dynamic Liquid Meniscus." Still additional embodiments of the proximity head are described in U.S. patent application Ser. No. 10/404,692, filed on Mar. 31, 2003, entitled "Methods and Systems for Processing a Substrate Using a Dynamic Liquid Meniscus" and U.S. patent application Ser. No. 10/603,427, filed on Jun. 24, 2003, and entitled "Methods and Systems for Processing a Bevel Edge of a Substrate Using a Dynamic Liquid Meniscus." The aforementioned applications being incorporated by reference in their entirety.

The endpoint detection methods and systems described herein can be also used in a plasma-etch process such as described in U.S. patent application Ser. No. 10/390,520, filed on Mar. 14, 2003, and entitled "System, Method and Apparatus for Improved Local Dual-Damascene Planarization" and U.S. patent application Ser. No. 10/390,117, filed on Mar. 14, 2003, and entitled "System, Method and Apparatus for Improved Global Dual-Damascene Planarization." The aforementioned applications being incorporated by reference in their entirety.

Figure 2A:
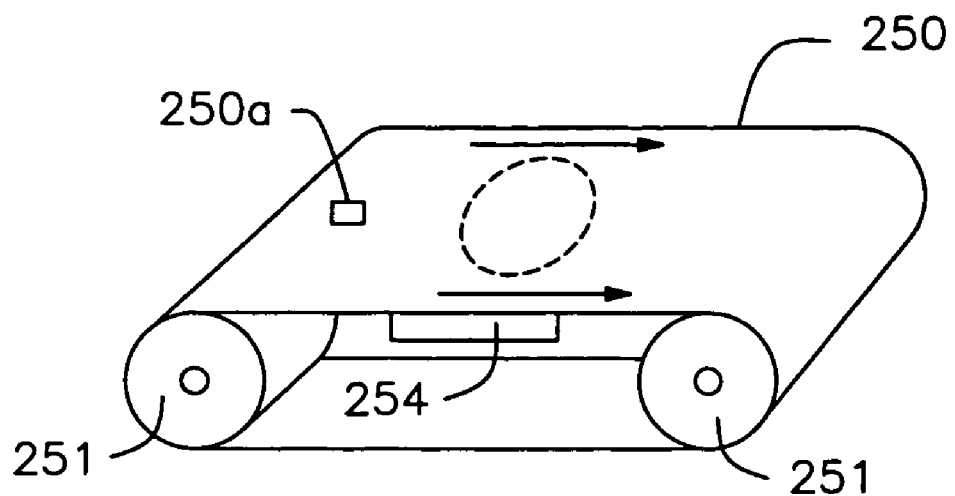
FIG. 2A shows a CMP system in which a pad is designed to rotate around rollers, in accordance with an embodiment of the present invention.
Figure 2B:
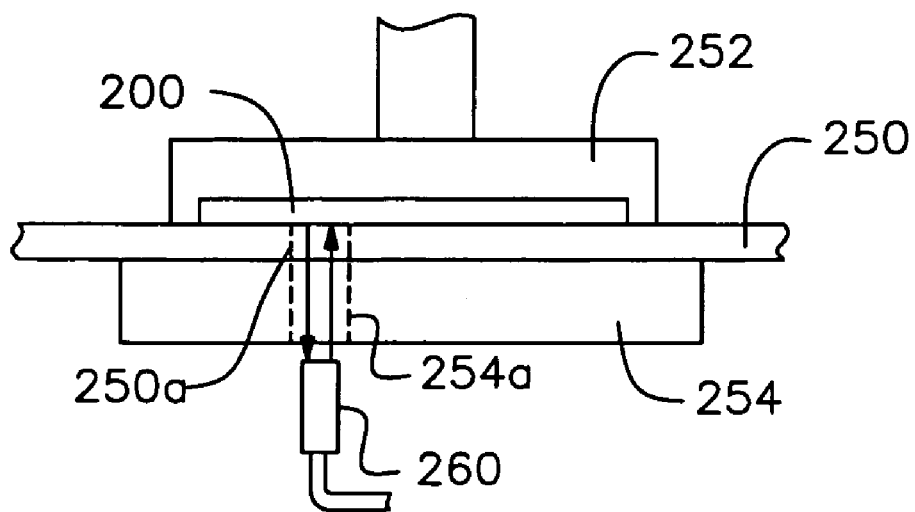
FIG. 2B is a endpoint detection system in accordance with one embodiment of the present invention.

FIG. 2A shows a CMP system in which a pad 250 is designed to rotate around rollers 251, in accordance with an embodiment of the present invention. A platen 254 is positioned under the pad 250 to provide a surface onto which a wafer will be applied using a carrier 252. Endpoint detection is performed using an optical detector 260 in which light is applied through the platen 254, through the pad 250 and onto the surface of the wafer 200 being polished, as shown FIG. 2B. In order to accomplish optical endpoint detection, a pad slot 250a is formed into the pad 250. In some embodiments, the pad 250 may include a number of pad slots 250a strategically placed in different locations of the pad 250. Typically, the pad slots 250a are designed small enough to minimize the impact on the polishing operation. In addition to the pad slot 250a, a platen slot 254a is defined in the platen 254. The platen slot 254a is designed to allow the broad band optical beam to be passed through the platen 254, through the pad 250, and onto the desired surface of the wafer 200 during polishing.

By using the optical detector 260, it is possible to ascertain a level of removal of certain films from the wafer surface. This detection technique is designed to measure the thickness of the film by inspecting the interference patterns received by the optical detector 260. Additionally, the platen 254 is designed to strategically apply certain degrees of back pressure to the pad 250 to enable precision removal of the layers from the wafer 200.

Figure 3:
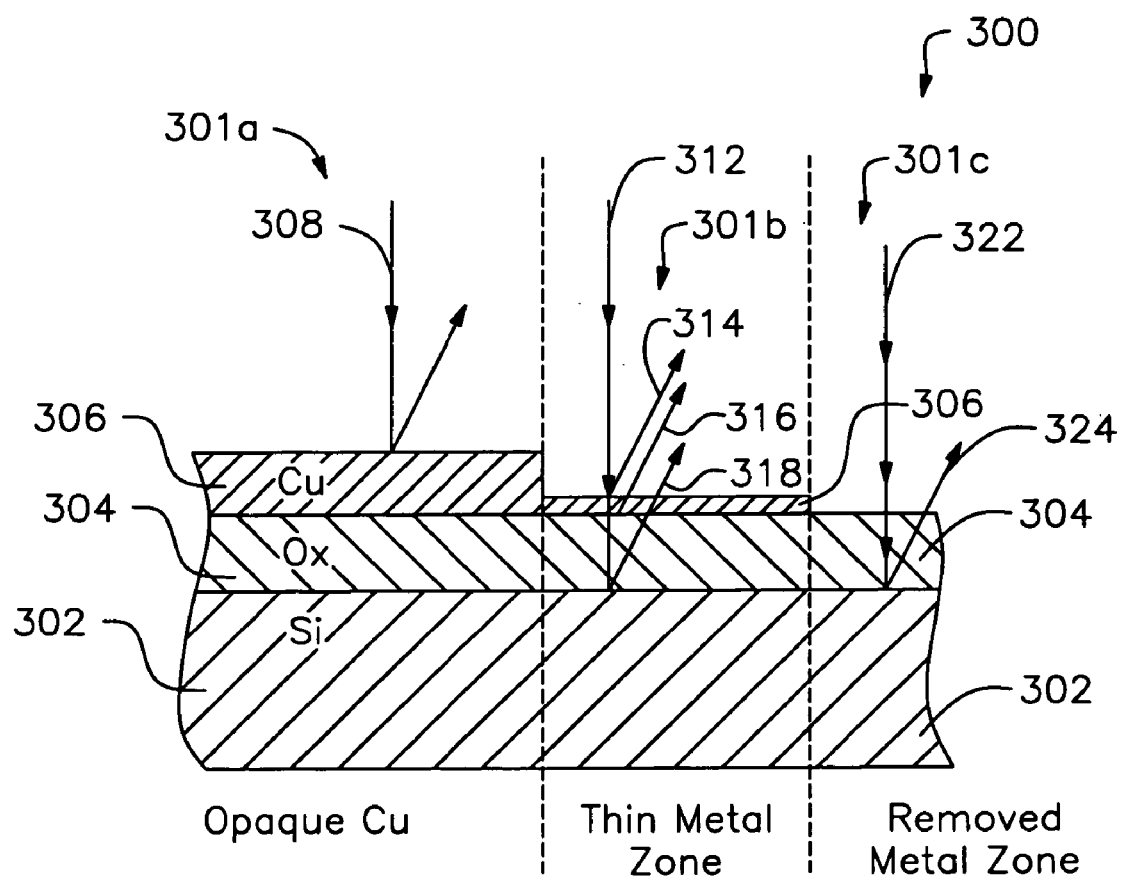
FIG. 3 is a diagram showing a portion of a wafer illuminated by a broad band light source during a CMP process, in accordance with one embodiment of the present invention.

FIG. 3 is a diagram showing a portion of a wafer 300 illuminated by a broad band light source during a CMP process, in accordance with one embodiment of the present invention. The wafer 300 includes a silicon substrate 302, an oxide layer 304 disposed over the substrate 302, and a copper layer 306 formed over the oxide layer 304. The copper layer 306 represents overburdened copper formed during a Damascene CMP process. Generally, the copper layer 306 is deposited over the oxide layer 304, which is etched in an earlier step to form trenches for copper interconnects. The overburden copper is then removed by polishing to expose the oxide layer 304, thus leaving only the conductive lines within the trenches. Dual Damascene occurs in a similar manner and allows the formation of metal plugs and interconnects at the same time.

During the polishing process, an optical endpoint detection system uses the optical interference to determine when the copper 306 has been removed. Initially, shown in view 301a, the copper layer 306 is relatively thick (e.g., about 10,000 Å) and thus opaque. At this point, the light 308 that illuminates the surface of the wafer 300 is reflected back with little or no interference. As the copper is polished down, the copper layer 306 becomes a thin metal (e.g., at about 300–400 Å thick). This is known as the thin metal zone. At this point, shown in view 301b, the copper layer 306 becomes transparent to at least some wavelengths of the light 312 and those wavelengths can pass through the copper layer 306 to illuminate the layers beneath.

When some wavelengths of the light 312 begin illuminating the layer 304, other wavelengths of the light 312 continue to reflect back from the surface of the thin metal zone copper layer 306. The intensity of the reflected wavelengths of light 318 that are reflected from the interface between layer 304 and layer 302, below the copper layer 306, is different than the intensity of the same wavelengths of light 314 reflected from the copper layer 306. However, only the intensities of the wavelengths that are reflecting from the interface between layer 304 and layer 302 will change. The intensities of the remaining wavelengths of light 314 that are reflected from the copper layer 306 will not change.

One reason the intensities of the wavelengths of light 318 change is due to the fact that each of the various layers 302–306 have a corresponding reflective index. The reflective index impacts the intensity of the light reflected from that layer.

As the copper is fully removed, as shown in view 301c, the copper layer 306 is no longer present to reflect or block the passage of any of the wavelengths of the light 322. Therefore, all wavelengths of the light 322 can then illuminate the layer 304 that lies below the copper layer 306. Substantially all wavelengths of the light 324 reflected back from the layer 304 will have a change in intensity level as compared to the intensity of the same wavelengths of light reflected from the copper layer 306.

The optical detector 260 detects the reflected light 308, 314, 318, 324. Therefore, in one embodiment of the present invention, an endpoint is determined when substantially all of the wavelengths of the reflected light experience a change in intensity.

Thus, when the copper layer 306 is thick, the intensities of the wavelengths of light 308 do not change. However, multiple other interference source such as slurry thicknesses, belt interference, and other sources can cause intensity "noise" that can cause the intensities of all the wavelengths of reflected light to change. Therefore, the endpoint must be differentiated from the various intensity noise sources. In one embodiment, the present invention can detect the actual end point and differentiate that endpoint from various intensity noise sources.

Figure 4A:
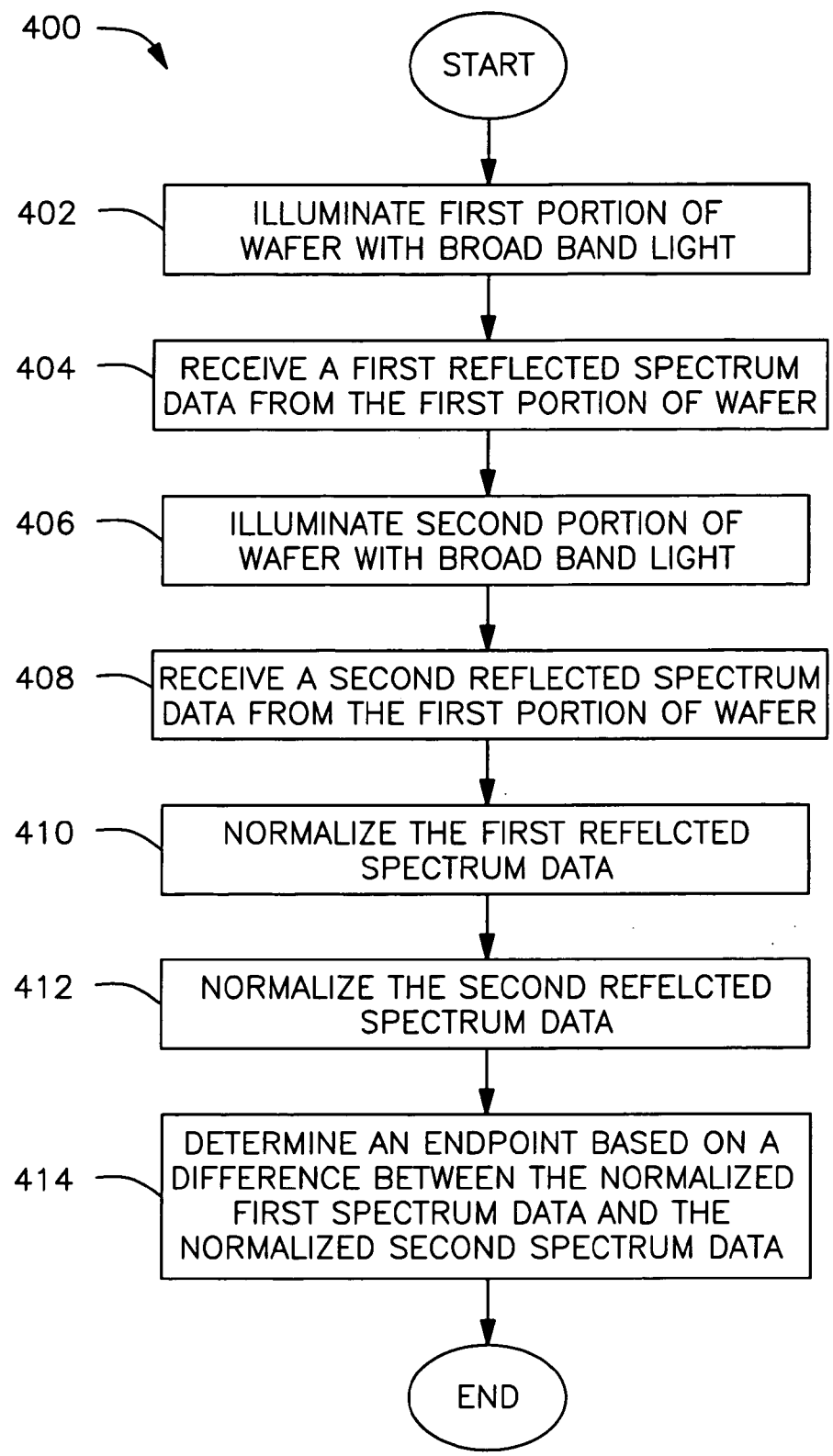
FIG. 4A is a flowchart diagram that illustrates the method operations performed in determining an endpoint for a CMP process in accordance with one embodiment of the present invention.

FIG. 4A is a flowchart diagram that illustrates the method operations performed in determining an endpoint for a CMP process in accordance with one embodiment of the present invention. In operation 402 a first portion of a surface of a wafer is illuminated with first beam of broad band light. In operation 404, a first reflected spectrum data (i.e., a first shot) is received. The first shot corresponds to a first set of spectra of light reflected from the first illuminated portion of the surface of the wafer. In one embodiment, the first shot includes an intensity level corresponding to each of several wavelengths in the corresponding first spectra. In one embodiment, the first reflected spectra are in the range of about 200 nm to about 720 nm wavelengths. The number of individual wavelengths that can be detected is limited only by the ability of the optical detector 260. In one embodiment, 512 individual wavelengths are detected, however, fewer or a greater number of individual wavelengths can also be detected.

In operation 406 a second portion of a surface of a wafer is illuminated with second beam of broad band light. In operation 408, a second reflected spectrum data is received (i.e., a second shot). The second shot corresponds to a second set of spectra of light reflected from the second illuminated portion of the surface of the wafer.

Figure 5A:
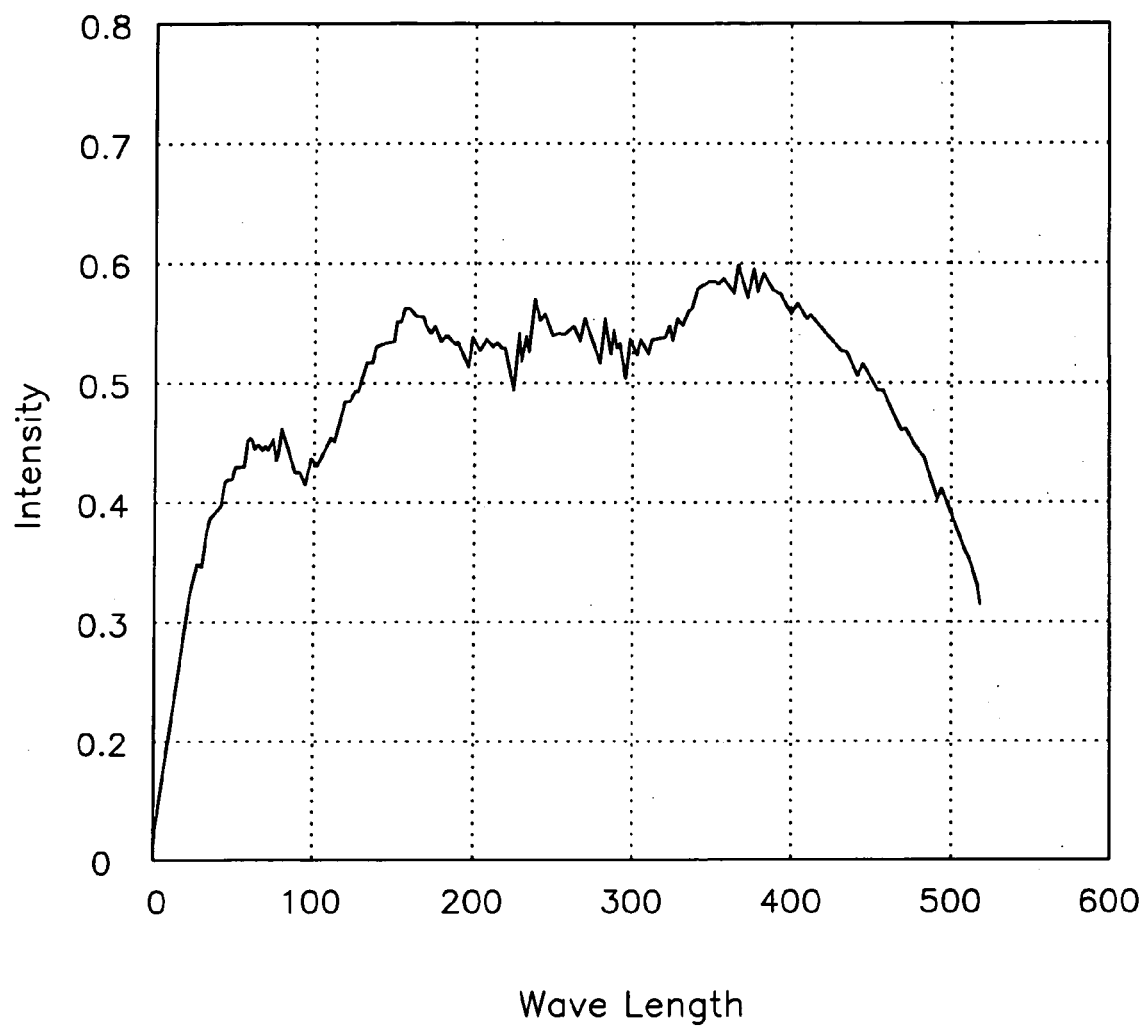
FIG. 5A illustrates one received reflected spectrum of data (i.e., shot) in accordance with one embodiment of the present invention.

FIG. 5A illustrates one received reflected spectrum of data (i.e., shot) in accordance with one embodiment of the present invention, such as the first shot received in operation 404 of FIG. 4A above. Approximately 512 individual wavelengths are shown across the x-axis. The intensity is shown on the y-axis.

Referring again to FIG. 4A, in operations 410 and 412, respectively, the first shot and the second shot are normalized. According to one embodiment, normalizing the first shot and the second shot includes substantially removing the intensity aspect from the shots. In one embodiment, the intensity is substantially removed by adjusting the intensity of each of the detected wavelengths such that a sum of the total intensities of all detected wavelengths is equal to zero and sum of squares of the total intensities of all detected wavelengths is equal to one.

Figure 4B:
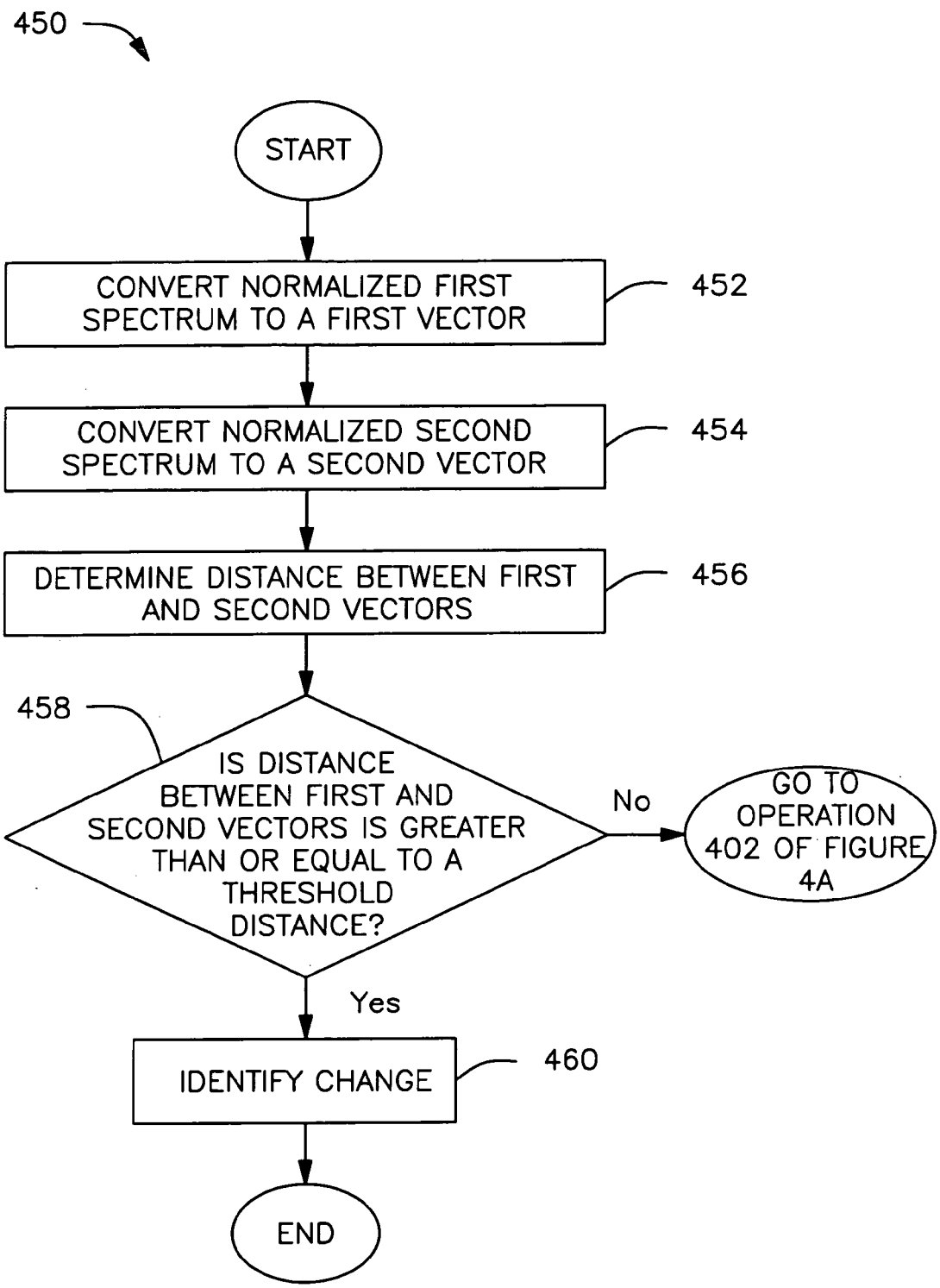
FIG. 4B is a flowchart diagram of the method operations 450 in calculating a change in proportions for at least a portion of the wavelengths in the first and second spectra in accordance with one embodiment of the present invention.
Figure 5B:
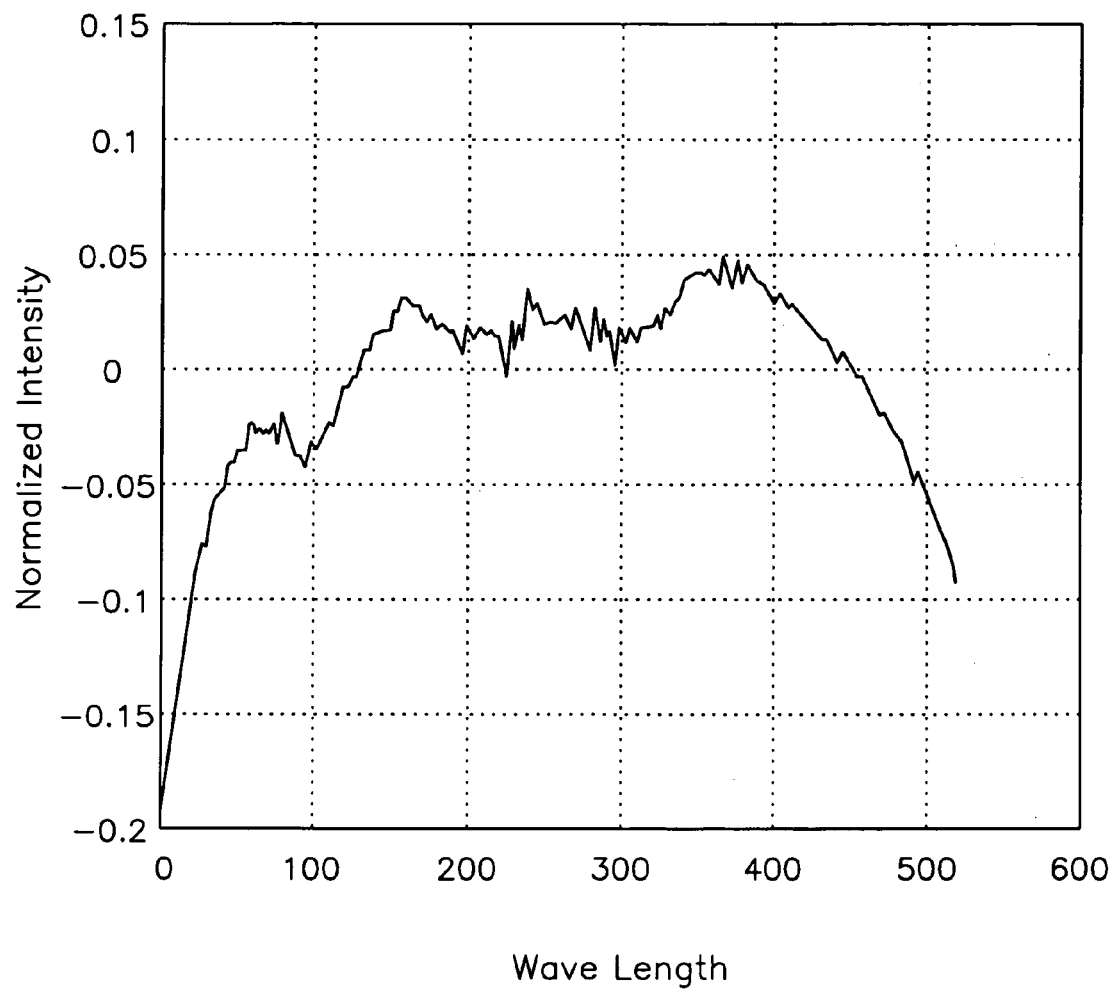
FIG. 5B illustrates one normalized reflected spectrum of data (i.e. a normalized shot) in accordance with one embodiment of the present invention.

FIG. 5B illustrates one normalized reflected spectrum of data (i.e. a normalized shot) in accordance with one embodiment of the present invention, such as the normalized first shot as determined in operation 410 of FIG. 4 above. Approximately 512 individual wavelengths are shown across the x-axis. The intensity is shown on the y-axis. The sum of the intensities is equal to zero and sum of squares of the total intensities of all detected wavelengths is equal to one. The method operations of normalizing a shot will be described in more detail below.

Referring again to FIG. 4A, in operation 414, a difference between the normalized first shot and the normalized second shot is determined and is used to determine an endpoint of the CMP process. In one embodiment, determining a difference between the normalized first shot and the normalized second shot includes determining a change in the proportions of intensity for at least a portion of the wavelengths in the first and second spectra.

FIG. 4B is a flowchart diagram of the method operations 450 in calculating a change in proportions for at least a portion of the wavelengths in the first and second spectra in accordance with one embodiment of the present invention. In operation 452, the normalized first spectrum data is converted to a first vector. In operation 454, the normalized second spectrum data is converted to a second vector. In operation 456, a distance between the first and second vectors is calculated. The distance between the first and second vectors is compared to a threshold distance to determine if the distance between the first and second vectors is greater than or equal to a threshold distance, in operation 458. If the distance between the first and second vectors is greater than or equal to the threshold distance, then a change in proportions of the intensity is identified for at least a portion of the wavelengths in the first and second spectra, in operation 460 and the method operations end.

Figure 5C:
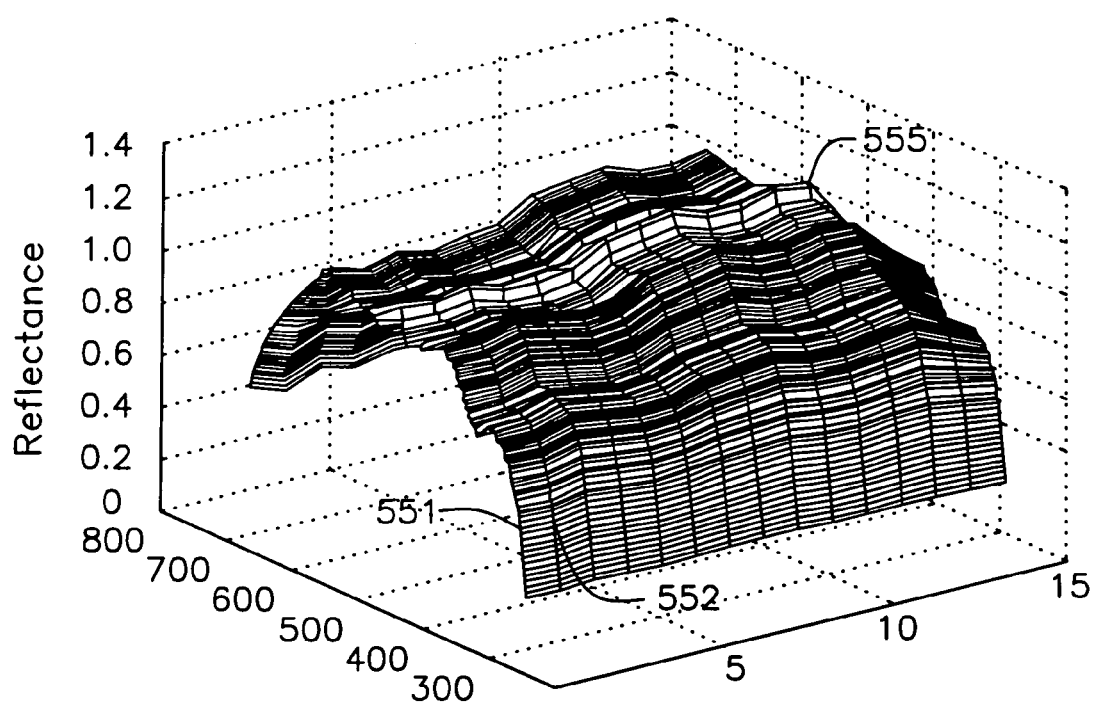
FIG. 5C is a three dimensional graphical illustration of several non-normalized shots in accordance with one embodiment of the present invention.

FIG. 5C is a three dimensional graphical illustration of several non-normalized shots in accordance with one embodiment of the present invention. The wavelengths in nm ranging from approximately 200 nm at the origin end of the z-axis to approximately 800 nm. Intensity is shown on the y-axis. The x-axis shows the number of shots, approximately 13 shots (shots 3–15) are shown. The number of shots shown can correspond to CMP processing time (i.e., polishing time). In one embodiment, the sampling rate is a function of the polishing belt speed and the amount of the end point detection windows in the belt. A line in the x-axis is drawn to connect the intensity of a given wavelength in a first shot to the intensity of the same wavelength in a subsequent shot. For example, pointer 551 identifies intensity level of approximately 310 nm in shot 3 (shots 0–2 are not shown). Pointer 552 identifies the corresponding intensity level of the same 310 nm wavelength in shot 4. The intensities of the various detected wavelengths vary from shot to shot but the variations are substantially proportionate in that the intensities of all wavelengths shift upward or downward at the same time. This indicates noise in the intensity dimension but does not indicate a change in the actual surface material reflecting the shot.

On the 13$^{th}$ shot (pointer 555) begins a marked downward trend in the intensities of all wavelengths, for subsequent shots 14 and 15, is shown. The downward trend indicated by pointer 555 identifies a change in the material reflecting the shot.

Figure 6:
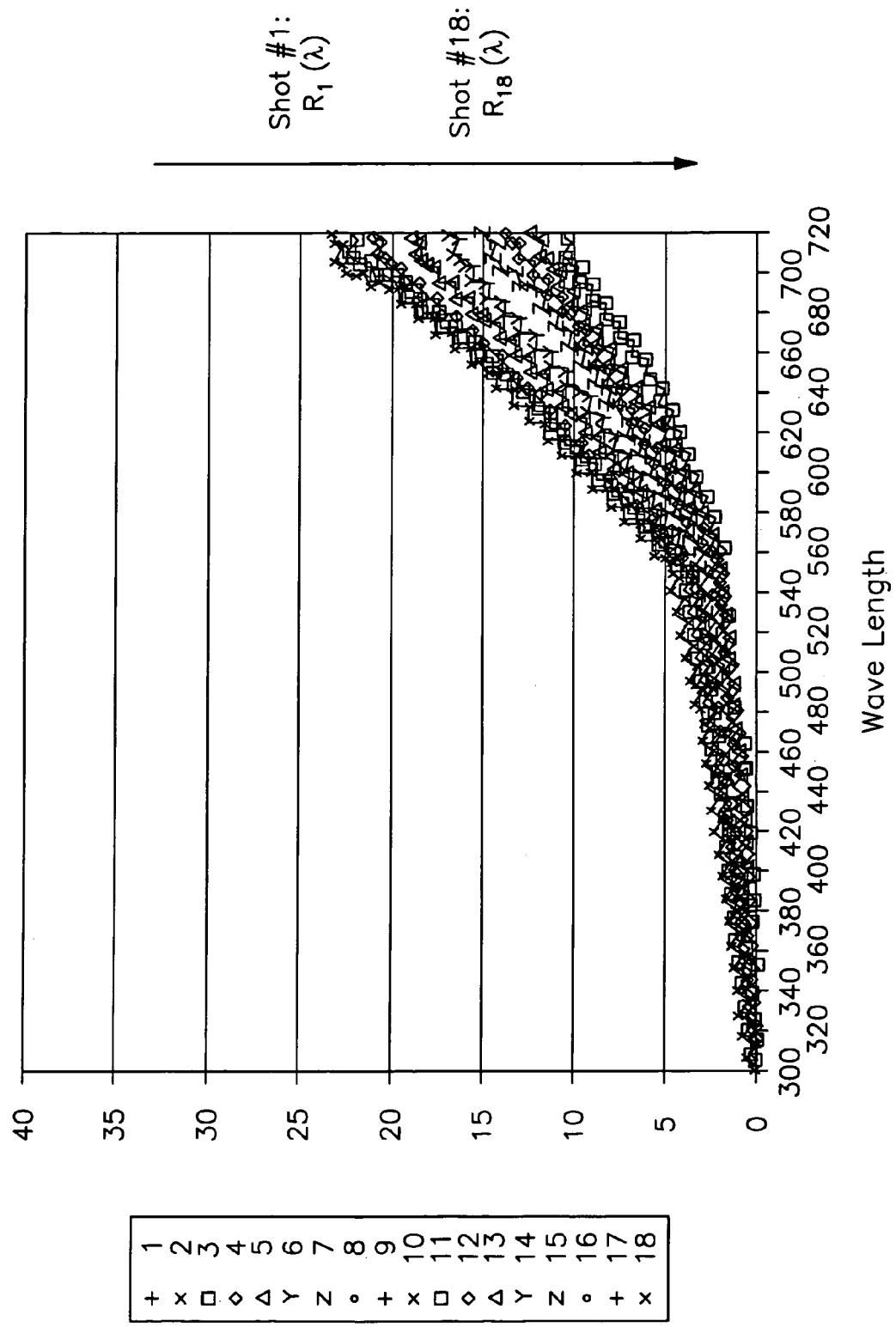
FIGS. 6 and 7 are graphs of the data shown in FIG. 5C above, in accordance with one embodiment of the present invention.
Figure 7:
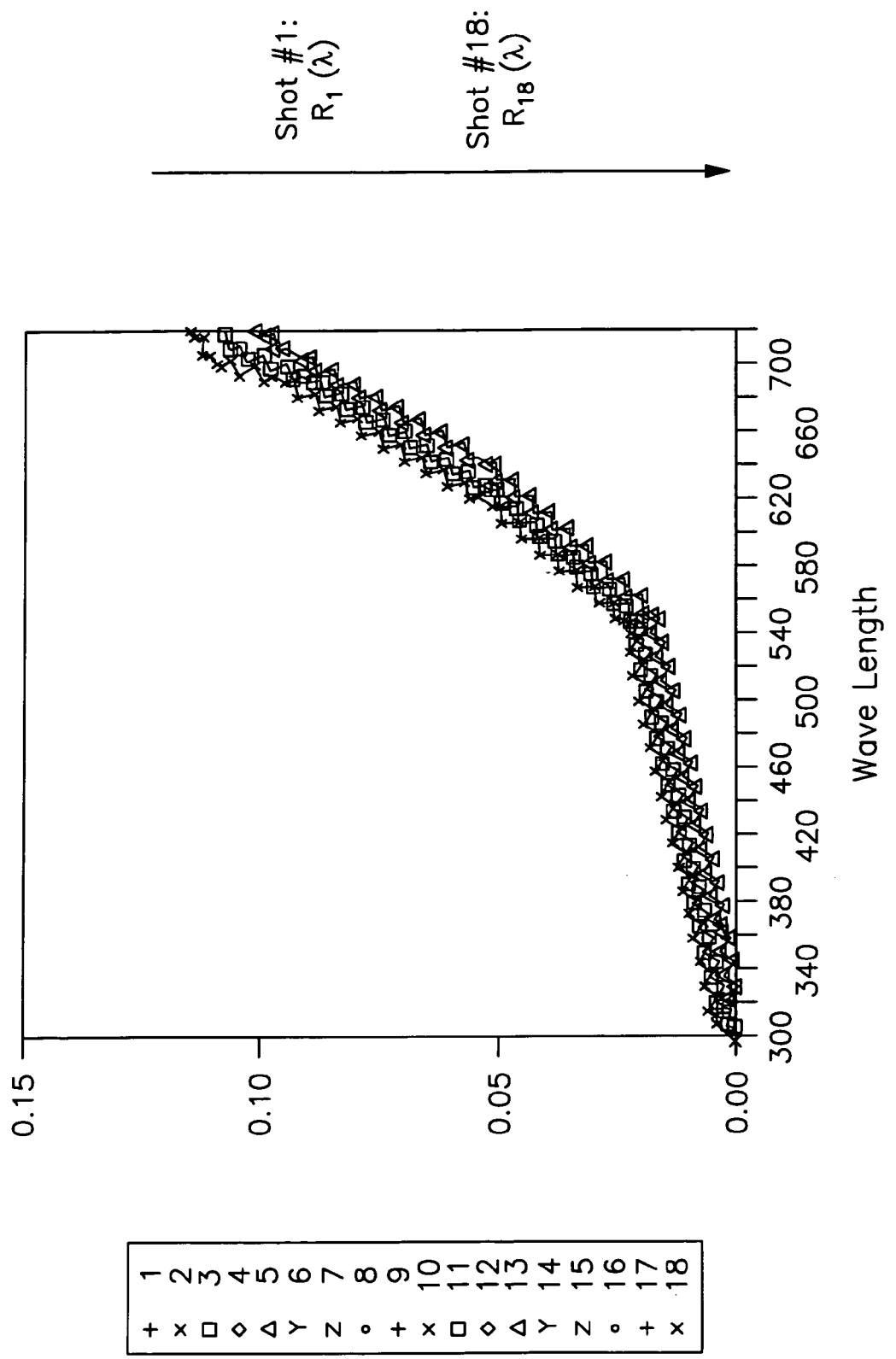

FIGS. 6 and 7 are graphs of the data shown in FIG. 5C above, in accordance with one embodiment of the present invention. In FIG. 6, the reflected data includes unwanted information such as absolute intensity changes that result in wide variations in the intensity of the reflected light for each of the shots shown.

Conversely, FIG. 7 illustrates the same reflected data that has been normalized to a relative intensity. Normalizing results in a narrow variation in the intensity of the reflected light for each of the shots shown.

The resolution of the reflected data can be increased by analyzing the reflecting coefficient change rather than the absolute intensity value. The reflecting coefficient change can be generated by Formula 2 as follows:

$$\text{Change} = \{\vec{R_i} - \vec{R_l}\} \quad \text{Formula 2:}$$

A change in the reflecting coefficient can indicate an endpoint (i.e., when the desired layer is fully removed).

Figure 8:
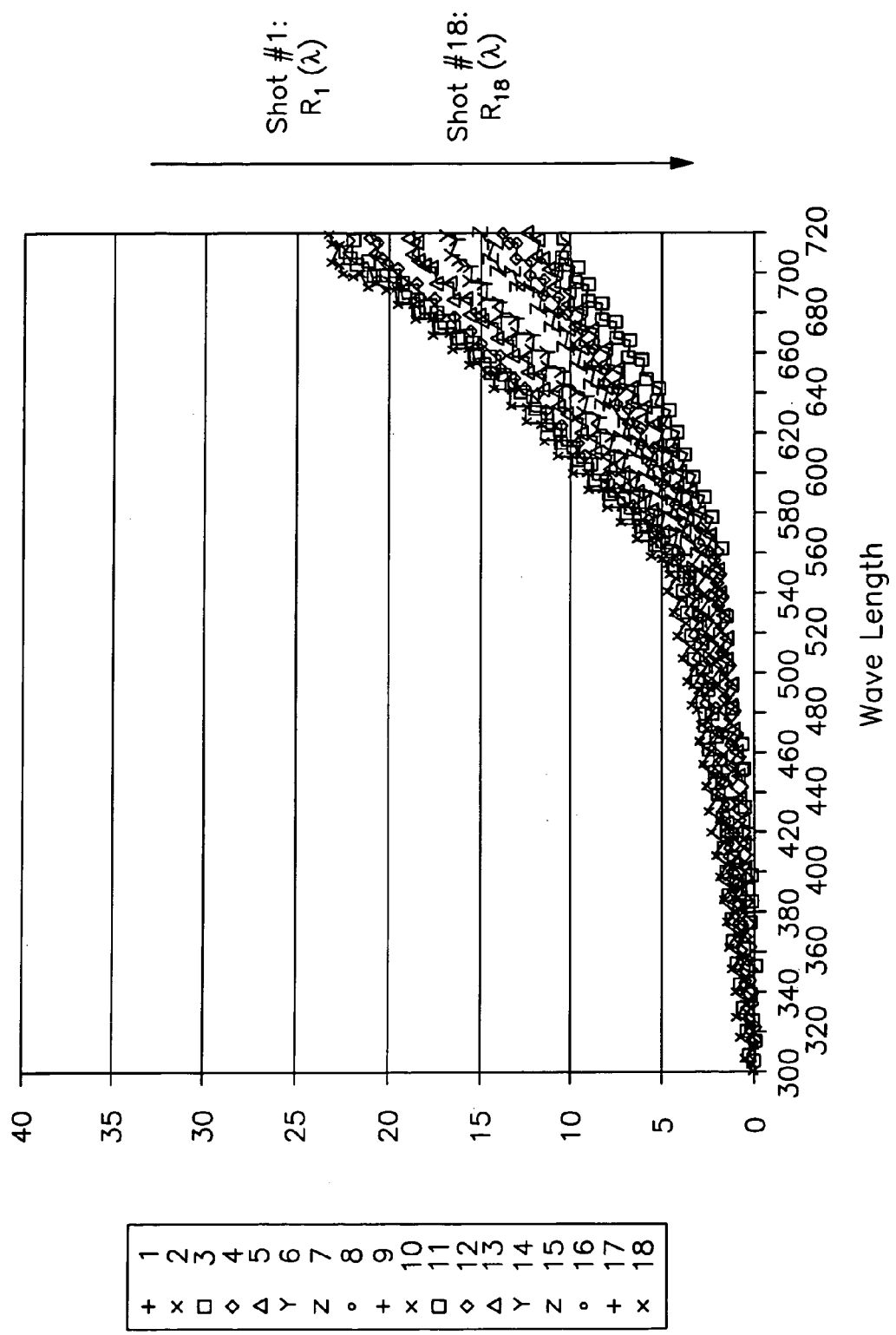
FIGS. 8 and 9 are two-dimensional graphs of the data shown in FIG. 5C above that have been enhanced in accordance with one embodiment of the present invention.
Figure 9:
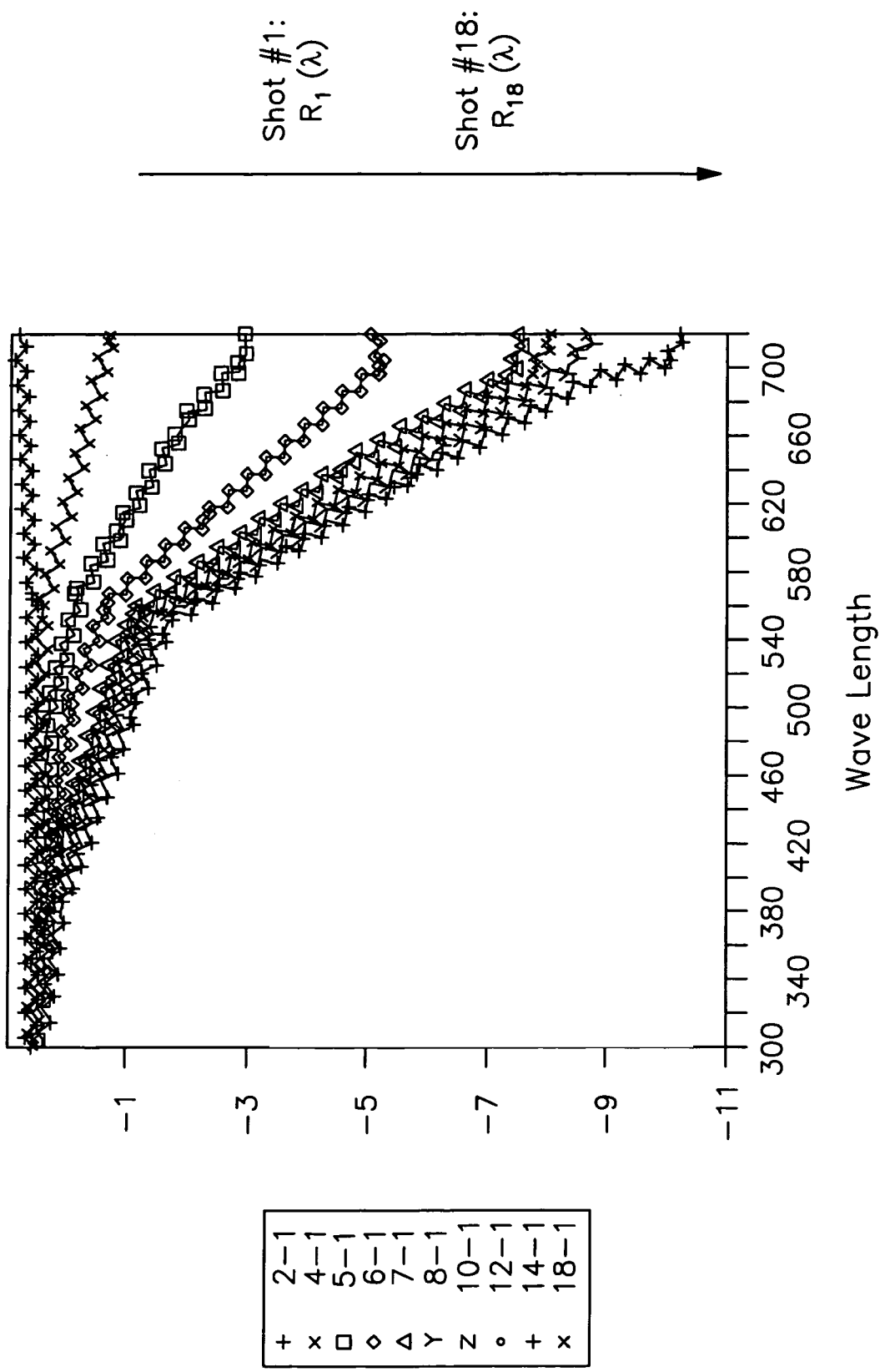

FIGS. 8 and 9 are two-dimensional graphs of the data shown in FIG. 5C above that have been enhanced in accordance with one embodiment of the present invention. In FIG. 8, the absolute value of the reflecting coefficient by wavelength and time is shown. In FIG. 9, the change of reflecting coefficient by wavelength with time is shown. This steps provides a characteristic signature of the film (material reflecting the light) is dependent on an interference effect. The characteristics of transparent film, i.e., where two surfaces meet, will reflect the light. For copper processes, the change in reflected data includes changing from opaque in visible spectra copper to a transparent film layer below the copper layer. After the reflected data is obtained in qualitative fashion described above, the data can be processed to build an endpoint detection based on this change.

Figure 10:
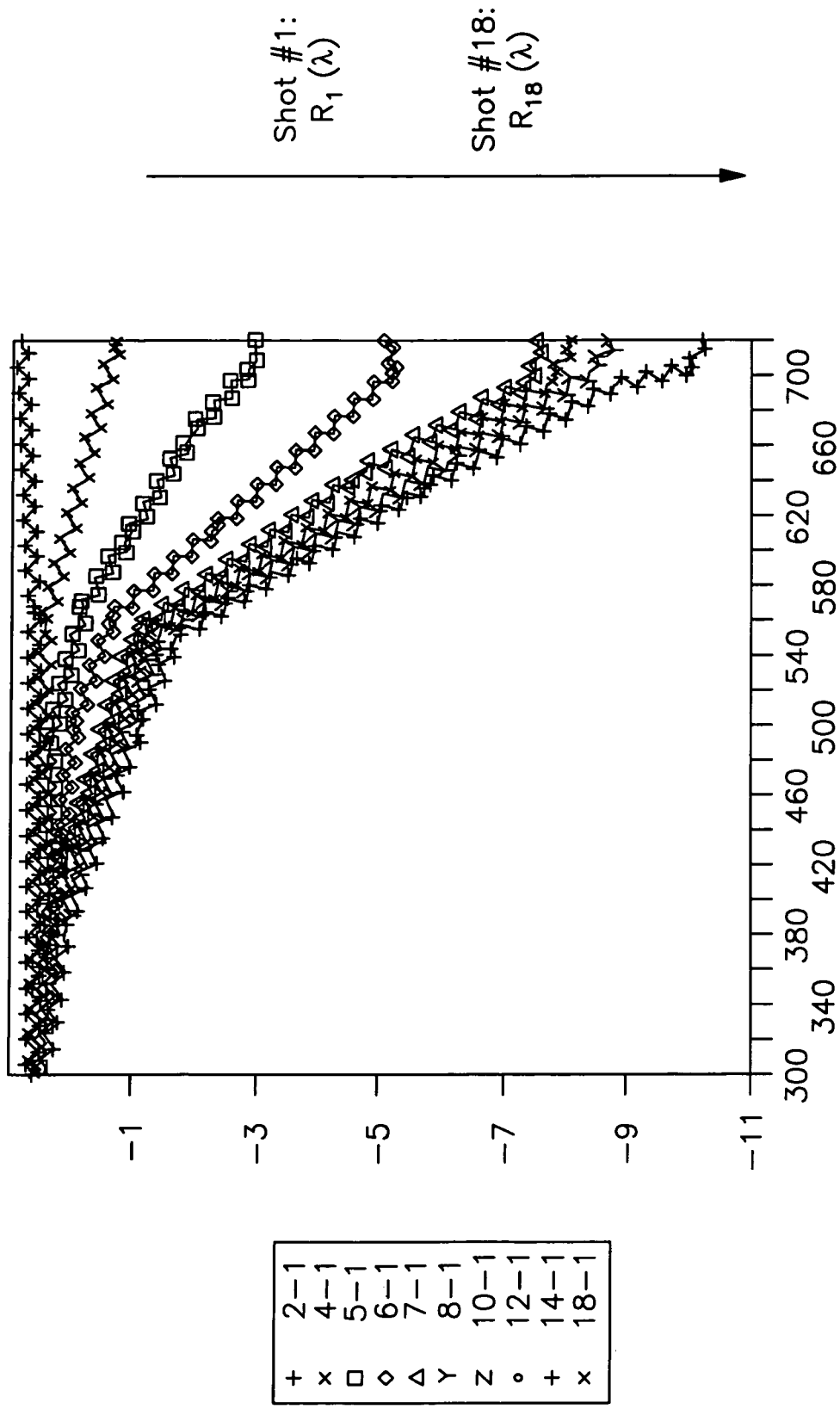
FIG. 10 is a graphical representation of reflected data that has a change of reflecting coefficient by wavelength with time that has not been normalized relative to intensity, in accordance with one embodiment of the present invention.
Figure 11:
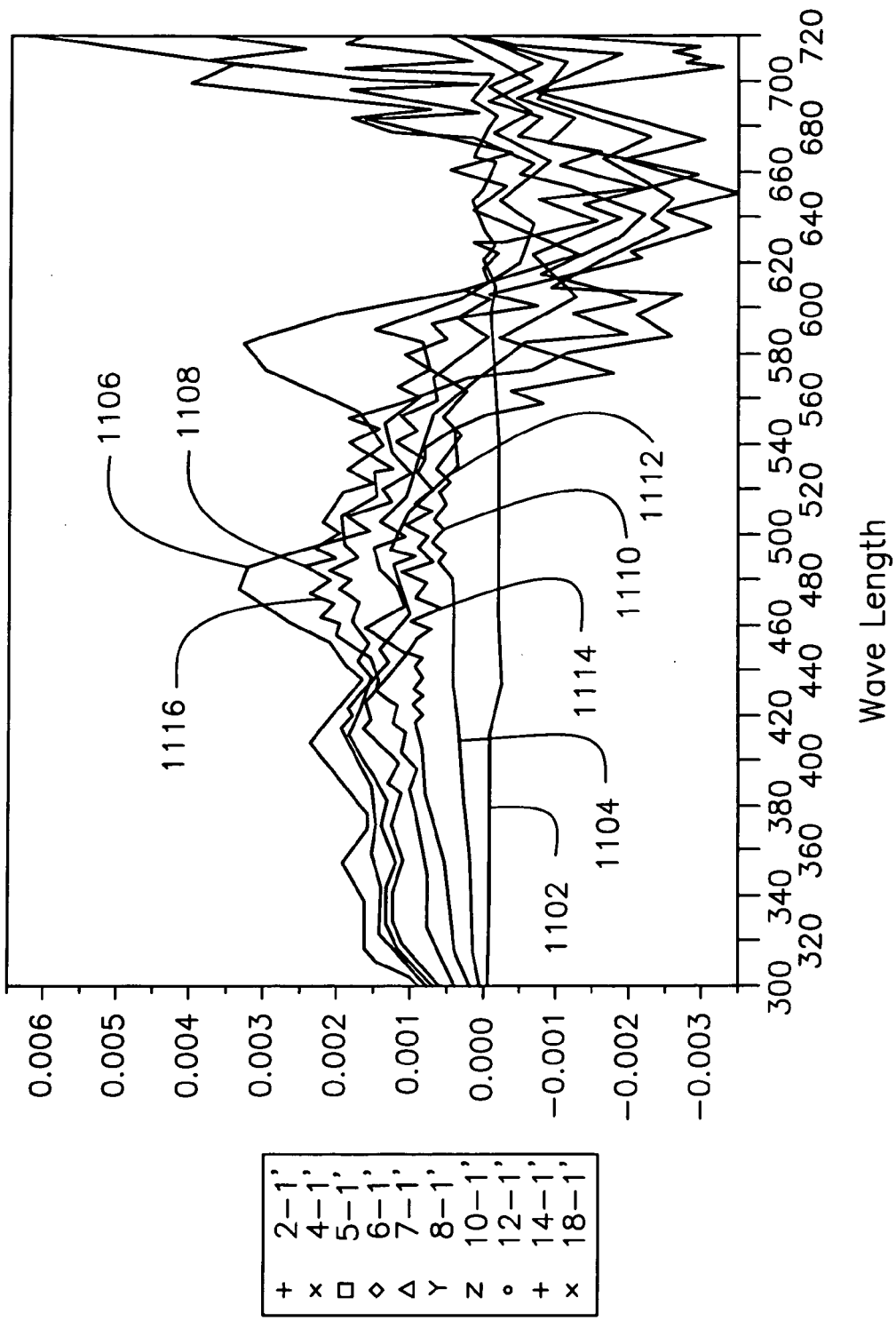
FIG. 11 is a graphical representation of reflected data that has an intensity normalized reflecting coefficient change in accordance with one embodiment of the present invention.

FIG. 10 is a graphical representation of reflected data that has a change of reflecting coefficient by wavelength with time that has not been normalized relative to intensity, in accordance with one embodiment of the present invention. FIG. 11 is a graphical representation of reflected data that has an intensity normalized reflecting coefficient change in accordance with one embodiment of the present invention. FIG. 11 demonstrates that measured value changes from straight line 1102, 1104 with some high frequency oscillations into well-defined sinusoidal interference related oscillations 1106, 1108, 1110,1112 and those lines with transitional states 1114, 1116.

A second characteristic of transparent films and a function of thickness and refractory index (not shown) can also influence the reflected data. For example, sinusoidal function of different frequencies relates to transition from one film to another.

Figure 12:
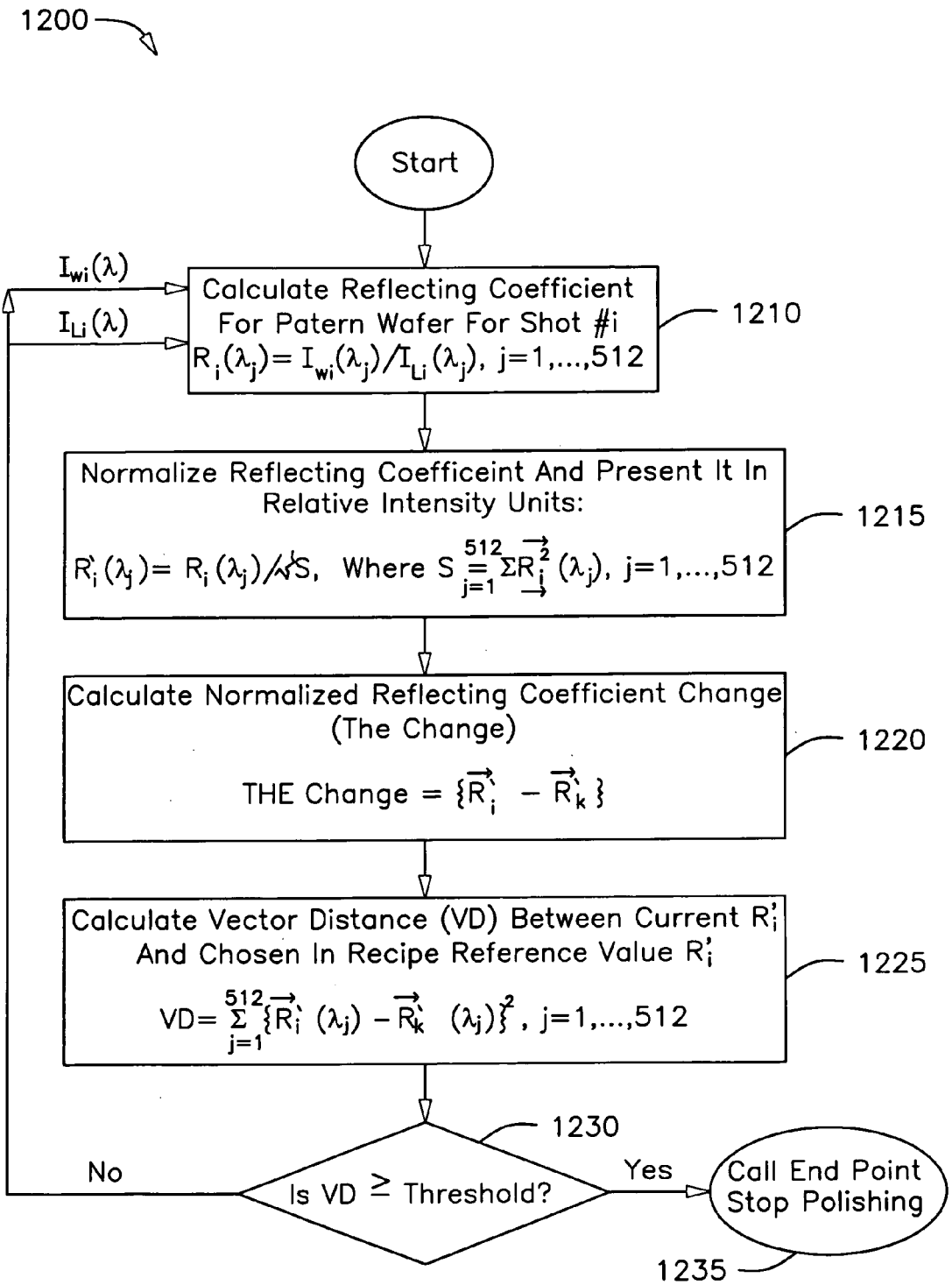
FIG. 12 is a flowchart diagram of method operations for determining an endpoint in accordance with one embodiment of the present invention.

FIG. 12 is a flowchart diagram of method operations 1200 for determining an endpoint in accordance with one embodiment of the present invention. In operation 1210, a reflecting coefficient for wafer for a first shot is calculated according to Formula 3 as follows:

$$R_i(\lambda_j) = I_{wi}(\lambda_j)/I_{Li}(\lambda_j), j=1, \ldots, 512 \quad \text{Formula 3:}$$

In operation 1215, the reflecting coefficient is normalized and presented in relative intensity units according to Formula 4 as follows:

$$R'_i(\lambda_j) = R_i(\lambda_j)/\sqrt{S}, \quad \text{Formula 4:}$$

$$\text{where } S = \sum_{j=1}^{512} R_i^2(\lambda_j), j = 1, \ldots, 512$$

In operation 1220, a change in the normalized reflecting coefficient (i.e., the change in material) is calculated according to Formula 5 as described above follows:

$$\text{THE Change} = \{\vec{R'_i} - \vec{R'_k}\} \quad \text{Formula 5:}$$

In operation 1225, the vector distance square (VD) between the current R'$_i$ and a pre-selected recipe reference value R'$_k$ is calculated according to Formula 6 as follows:

$$VD = \sum_{J=1}^{512} \left\{ \vec{R_i'}(\lambda_j) - \vec{R_k'}(\lambda_j) \right\}^2, j = 1, \ldots, 512 \qquad \text{Formula 6:}$$

In operation 1230, the calculated vector distance is compared to a threshold vector distance. The threshold VD can be a known change in vector distance that was determined from previous experience with removing the layer to be removed to reveal an underlying layer, in one embodiment. Alternatively, the threshold VD can be a pre-selected number indicating a direction in the change (e.g., an upward or a downward trend in the normalized reflecting coefficient. If the calculated VD is not greater than the threshold VD, then the I$_{wi}$($\lambda$) and the I$_{Li}$ ($\lambda$) are input to operation 1210 as described above and the method operations 1210–1230 repeat. If, however, in operation 1230, the calculated VD is greater than or equal to the threshold VD, then the end point has been determined and the CMP process can be stopped immediately.

Figure 13:
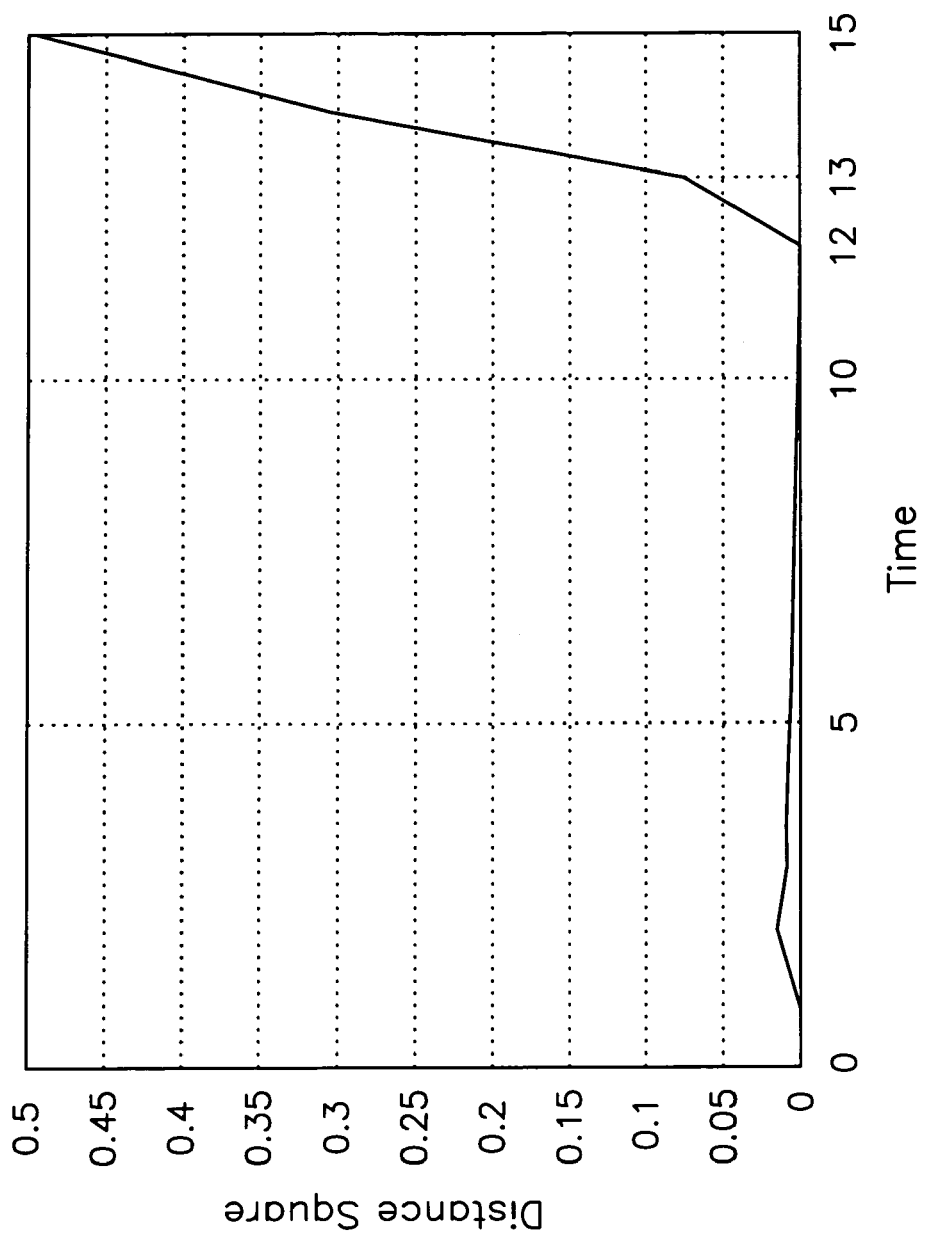
FIG. 13 is a graph of the vector distance squared (VD) of a material removal process in accordance with one embodiment of the present invention.

FIG. 13 is a graph of the vector distance squared (VD) of a material removal process in accordance with one embodiment of the present invention. The y-axis is the VD. The x-axis is time or more precisely shot number. From the origin to approximately the 12$^{th}$ shot, the graph shows the VD remains approximately constant value. The VD between the 12$^{th}$ shot and the 13$^{th}$ shot are much greater as shown by the graph. The change in the VD illustrated at the 12$^{th}$ shot indicates the endpoint has been detected.

While various aspects and embodiments of the invention have been described above relating to determining an endpoint when removing a copper layer, it should be understood that the methods and systems described herein can be similarly applied to the removal process of any other material. The methods and systems described herein can be similarly applied to the removal of other opaque or non-opaque materials that are overlaying a different opaque or non-opaque material. By way of example, methods and systems described herein can be used to determine an endpoint of the removal process for removing an oxide layer (non-opaque layer) over a copper layer (opaque layer). Similarly, an endpoint for removing an oxide layer (non-opaque layer) over another non-opaque material layer.

While various aspects and embodiments of the invention have been described above relating to determining an endpoint using 512 separate data points (e.g., wavelengths) along the spectrum of the reflected broad band light (e.g., Formula 6 wherein j=1–512). However, the present invention is not limited to only 512 separate data points and any number of data points can be used. The number of data points used is analogous to the granularity of the data received. For finer resolution of the data, a greater number of individual data points must be collected and used. However, the greater number of individual data points that are collected also increases the computational load. 512 individual data points are used to illustrate one level of granularity of the process. Fewer individual data points such as about 200 or less can also used. Alternatively, additional wavelengths can also be used such as more than about 520 data points.

As discussed herein two different scales are used for the same broad bandwidth light. A first scale is the wavelengths included in the spectrum of the broad band light. In one embodiment the spectrum of the broad band light is from about 300 to about 720 nm. However, the spectrum of broadband light that is used can be expanded to include shorter and/or longer wavelengths of light. In one embodiment the spectrum of broadband light is selected to correspond to the materials being processed in the CMP process. In one embodiment, a wider spectrum can be used for a wider variety of materials.

A second scale used to describe the detection of the broad bandwidth light is the number of data points that are distributed across the spectrum of the broadband light. In one embodiment, if the number of data points is 512 and the broadband spectrum is from about 300 to about 720 nm, then the first data point corresponds to a wavelength of approximately 298.6 nm and the 512 data point corresponds to wavelength approximately 719.3 nm. The number and distribution of the data points across the broadband spectrum is determined by the particular manufacturer of the optical detector. Typically, the data points are evenly distributed across the spectrum. The data points can also be referred to as a pixel.

The above-described endpoint detection process can also be used in a stress-free etch process such as described in U.S. patent application Ser. No. 10/390,520, filed on Mar. 14, 2003, and entitled "System, Method and Apparatus for Improved Local Dual-Damascene Planarization" and U.S. patent application Ser. No. 10/390,117, filed on Mar. 14, 2003, and entitled "System, Method and Apparatus for Improved Global Dual-Damascene Planarization." The aforementioned applications being incorporated by reference in their entirety.

Figure 14:
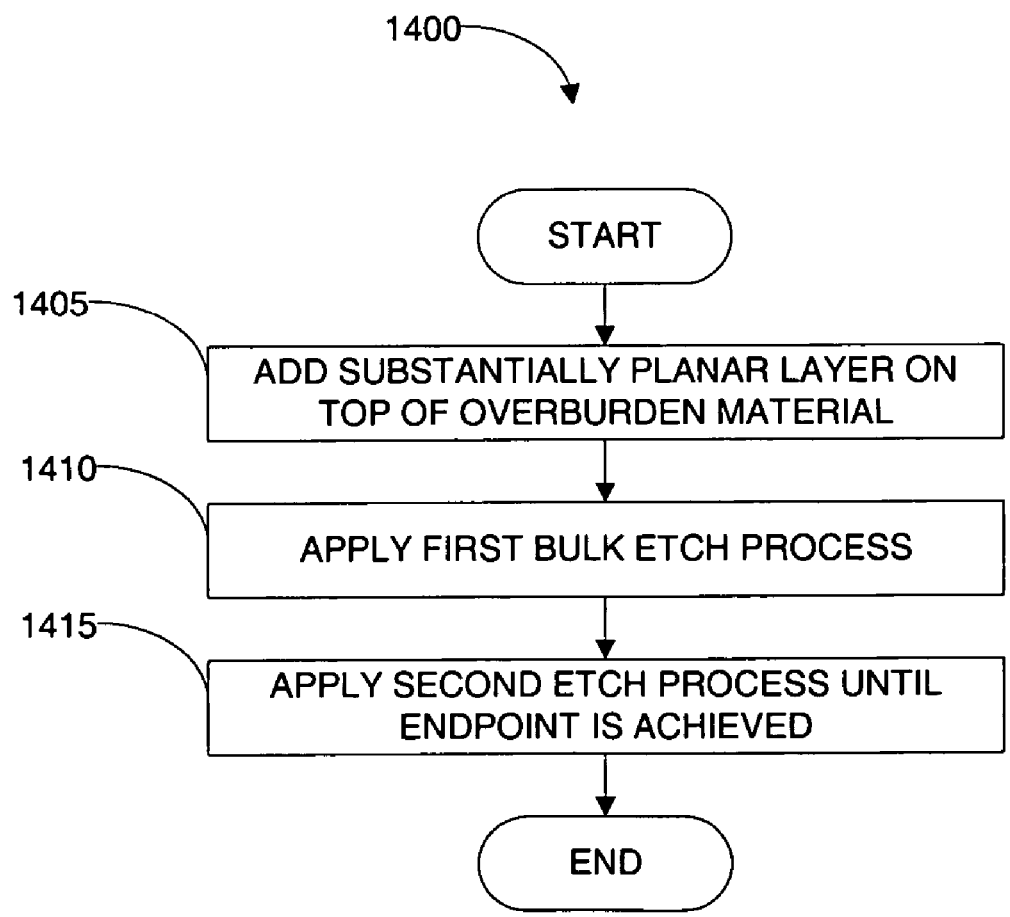
FIG. 14 is a flowchart of the method operations of performing a stress-free planarization etch process, in accordance with one embodiment of the present invention.

FIG. 14 is a flowchart 1400 of the method operations of performing a stress-free planarization etch process, in accordance with one embodiment of the present invention. In operation 1405, an additional layer is added on top of a conductive overburden portion. In operation 1410, the first etch process is applied to remove the majority of the additional layer and the conductive overburden portion. In operation 1415, the second etch process is applied to remove the remaining overburden portion until an endpoint is achieved.

The endpoint detection methods and systems described herein can be used in a proximity head systems and methods such as described in co-owned U.S. patent application Ser. No. 10/330,843 filed on Dec. 24, 2002 and entitled "Meniscus, Vacuum, IPA Vapor, Drying Manifold," which is a continuation-in-part of co-pending U.S. patent application Ser. No. 10/261,839 filed on Sep. 30, 2002 and entitled "Method and Apparatus for Drying Semiconductor Wafer Surfaces Using a Plurality of Inlets and Outlets Held in Close Proximity to the Wafer Surfaces," both of which are incorporated herein by reference in its entirety. Additional embodiments and uses of the proximity head are also disclosed in U.S. patent application Ser. No. 10/330,897, filed on Dec. 24, 2002, entitled "System for Substrate Processing with Meniscus, Vacuum, EPA vapor, Drying Manifold" and U.S. patent application Ser. No. 10/404,692, filed on Mar. 31, 2003, entitled "Methods and Systems for Processing a Substrate Using a Dynamic Liquid Meniscus." Still additional embodiments of the proximity head are described in U.S. patent application Ser. No. 10/404,692, filed on Mar. 31, 2003, entitled "Methods and Systems for Processing a Substrate Using a Dynamic Liquid Meniscus," U.S. patent application Ser. No. 10/603,427, filed on Jun. 24, 2003, and entitled "Methods and Systems for Processing a Bevel Edge of a Substrate Using a Dynamic Liquid Meniscus," and U.S. patent application Ser. No. 10/606,022, filed on Jun. 24, 2003, and entitled "System and Method for Integrating In-Situ Metrology within a Wafer Process." The aforementioned applications being incorporated by reference in their entirety.

Figure 15A:
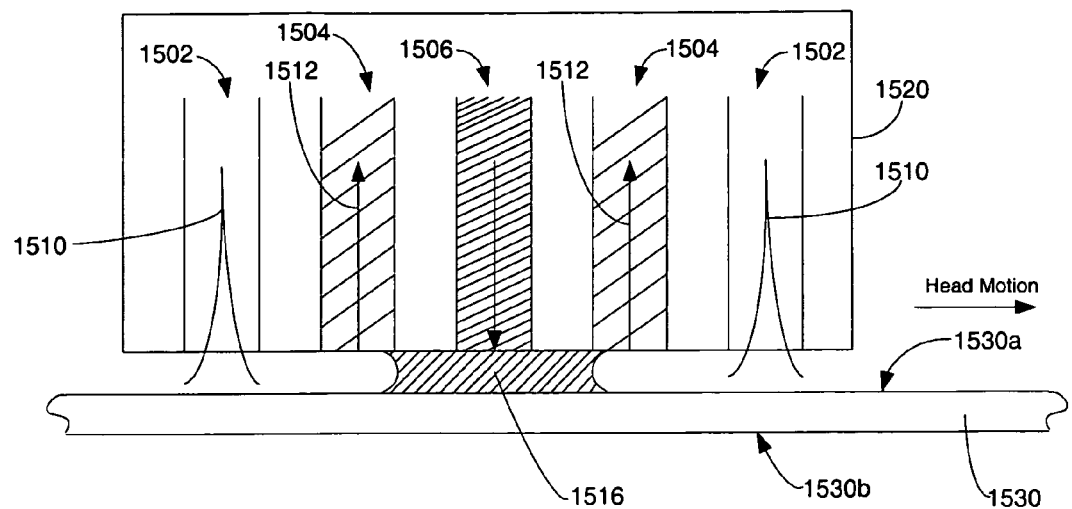
FIG. 15A illustrates a proximity head performing an exemplary wafer processing operation in accordance with one embodiment of the present invention.

FIG. 15A illustrates a proximity head 1520 performing an exemplary wafer processing operation in accordance with one embodiment of the present invention. The proximity head 1520, in one embodiment, moves while in close proximity to the top surface 1530*a* of the wafer 1530 to conduct a cleaning, drying, etching or other processing operation. It should be appreciated that the proximity head 1530 may also be utilized to process (e.g., clean, dry, etc.) the bottom surface 1530*b* of the wafer 1530. In one embodiment, the wafer 1530 is rotating so the proximity head 1520 may be moved in a linear fashion along the head motion while fluid is removed from the top surface 1530*a*. By applying the IPA 1510 through the source inlet 1502, the vacuum 1512 through source outlet 1504, and the deionized water 1514 through the source inlet 1506, the meniscus 1516 can be generated.

Figure 15B:
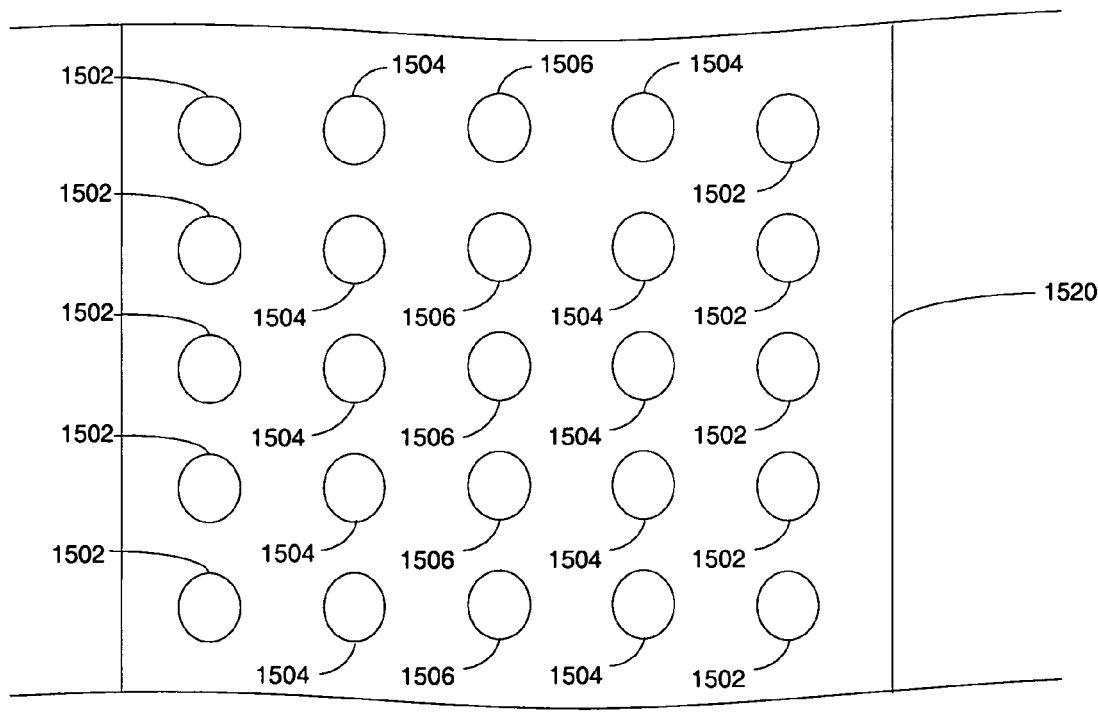
FIG. 15B shows a top view of a portion of a proximity head in accordance with one embodiment of the present invention.

FIG. 15B shows a top view of a portion of a proximity head 1520 in accordance with one embodiment of the present invention. In the top view of one embodiment, from left to right are a set of the source inlet 1502, a set of the source outlet 1504, a set of the source inlet 1506, a set of the source outlet 1504, and a set of the source inlet 1502. Therefore, as N$_2$/IPA and DIW are inputted into the region between the proximity head 1520 and the wafer 1530, the vacuum removes the N$_2$/IPA and the DIW along with any fluid film that may reside on the wafer 1530. The source inlets 1502, the source inlets 1506, and the source outlets 1504 described herein may also be any suitable type of geometry such as for example, circular opening, square opening, etc. In one embodiment, the source inlets 1502 and 1506 and the source outlets 1504 have circular openings.

Figure 16A:
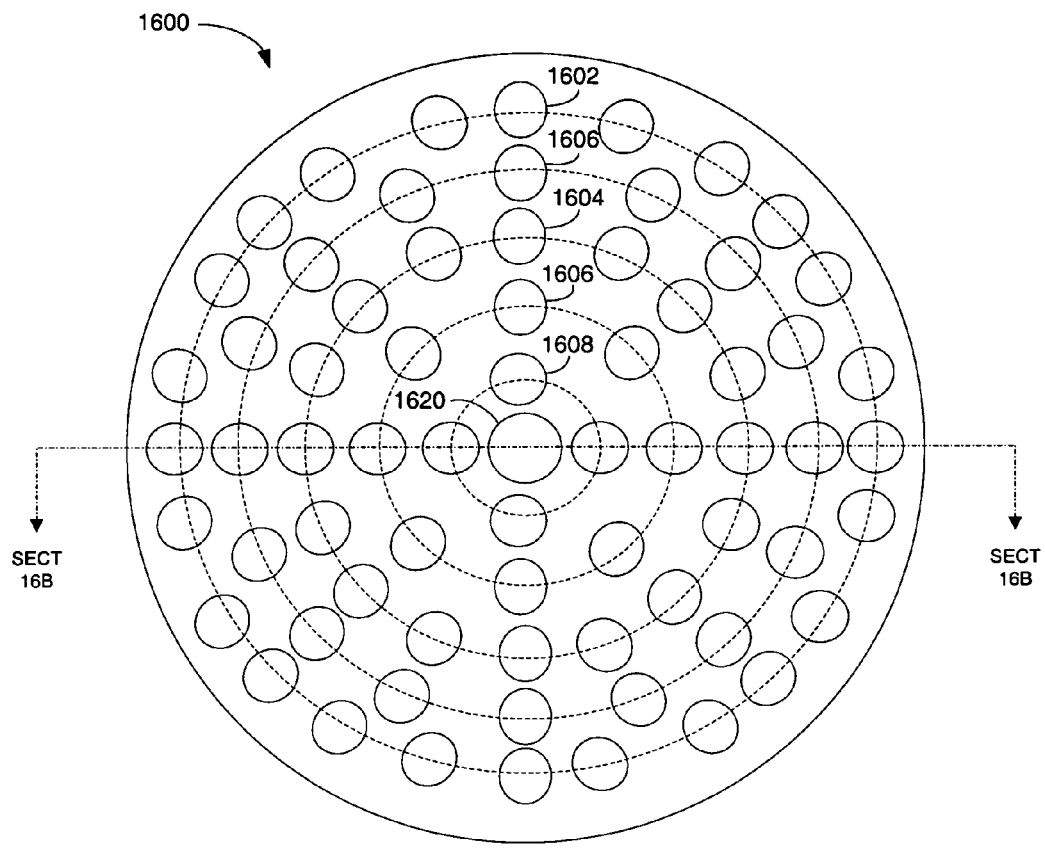
FIG. 16A illustrates an exemplary proximity head, in accordance with one embodiment of the present invention.
Figure 16B:
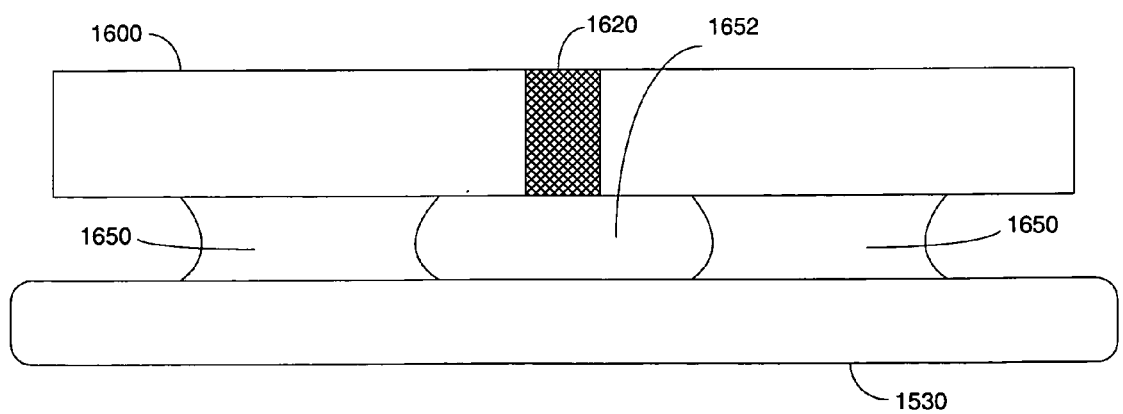
FIG. 16B illustrates a sectional view of the proximity head and the meniscus formed by the proximity head, in accordance with one embodiment of the present invention.

FIG. 16A illustrates an exemplary proximity head 1600, in accordance with one embodiment of the present invention. FIG. 16B illustrates a sectional view of the proximity head 1600 and the meniscus 1650 formed by the proximity head 1600, in accordance with one embodiment of the present invention. The proximity head 1600 includes a ring of multiple process chemistry inlets 1604, two rings of multiple EPA inlets 1602 and 1608 and a ring of multiple vacuum outlets 1606. The various inlets 1602, 1604, 1606 and outlets 1608 are arranged around a sensor 1620. The sensor 1620 is a metrology sensor that can evaluate the progress of the fabrication process being applied by the processing head 1600. The sensor can be an optical endpoint detection sensor so as to enable the above-described endpoint detection systems and methods to be used.

The meniscus 1650 can include a "dry" central region 1652 where the liquid meniscus is removed so that the sensor 1620 has no intervening processing chemistry from the meniscus 1650 between the sensor and the surface of the wafer 1530. Rotating the wafer 1530 and scanning the proximity head 1600, and therefore the sensor 1620, across the wafer 1530 can provide an in-situ scan of the entire surface of the wafer, as the proximity head processes the wafer. The sensor 1620 can also provide real time feedback of the etch process. Providing the real time feedback to a control system that controls the etch process will provide a closed control loop of the etch process. The closed loop control of the etch process can allow the control system to interactively adjust the etch process in real time. Any of the multiple etch process variables can be adjusted including head position, concentrations, resident time, flow rates, pressures, chemistry and other process variables. In this manner more precise process control is provided. A more precise process control allows ever more concentrated etch chemistries to be used, which in turn reduces the process time of the wafer to a minimum.

The in-situ, real time control of the process can also enable a variable process to be applied to the surface of the wafer such as to correct for a non-uniformity during the processing of the wafer. By way of example, if in an etch process, the sensor can detect a thinner film in a first region of the wafer 1530 and a thicker film in a second region. The etch process recipe can be dynamically adjusted (e.g., etch chemistry concentration, residence time, etc.) for the detected film thickness as the proximity head 1600 scans across the wafer 1530. As a result, the non-uniform film thickness can be dynamically corrected in-situ as the etch process is applied to the wafer 1530 thereby substantially eliminating the need for reprocessing the wafer to correct for non-uniformities.

In an alternative embodiment, the dry region 1652 is not required. By way of example, if the sensor 1620 can measure film thickness through a layer of liquid (e.g., the meniscus 1650) such as the process chemistry being applied to the surface of the wafer 1530.

Figure 17:
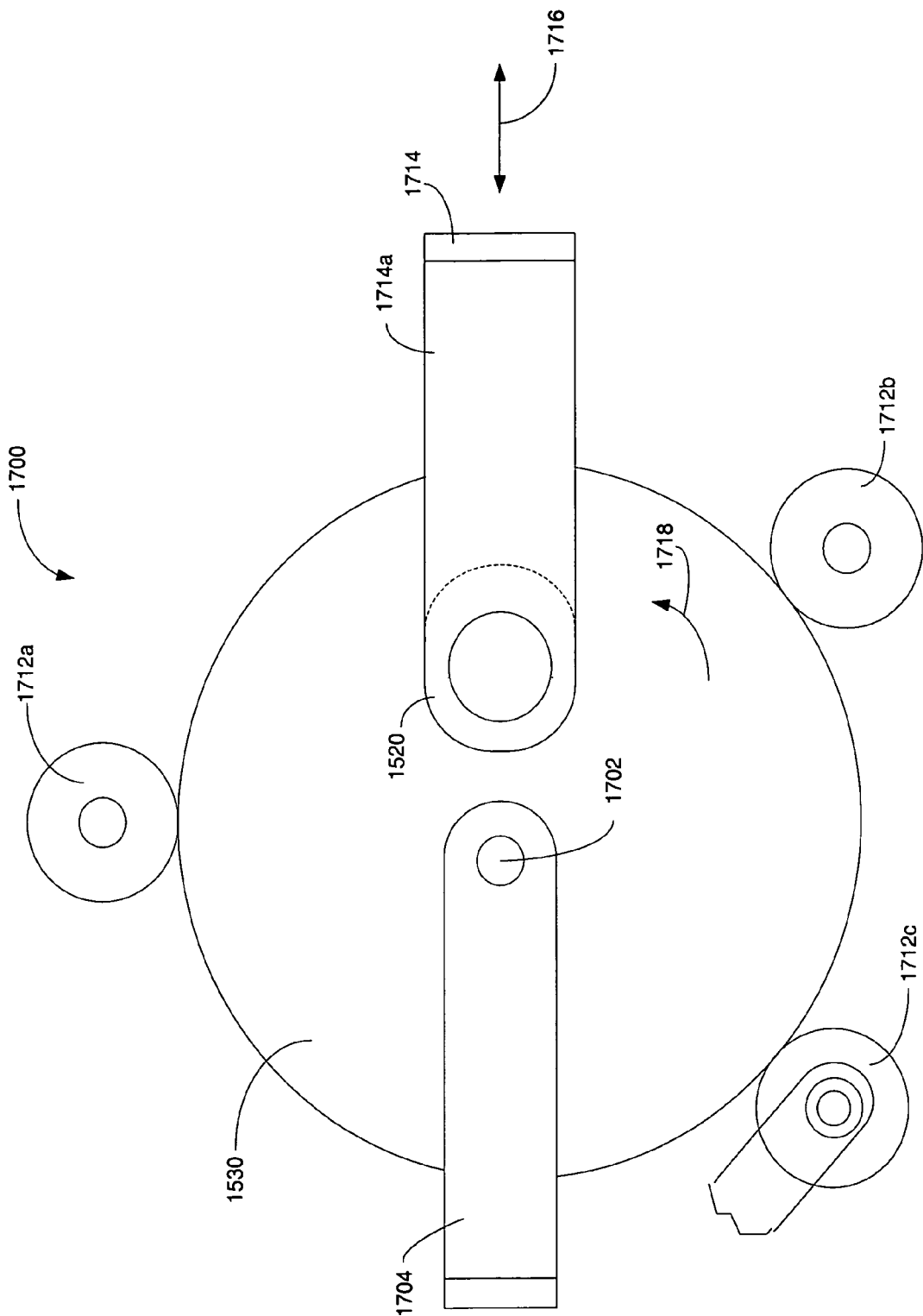
FIG. 17 shows a wafer processing system in accordance with one embodiment of the present invention.

FIG. 17 shows a wafer processing system 1700 in accordance with one embodiment of the present invention. The wafer processing system 1700 supports a wafer 1530 between multiple edge rollers 1712A–1712C. A movable arm 1714A supports and moves a proximity head 1520 over the surface of the wafer 1530. An in-situ sensor 1702 can be mounted on the arm 1714A, external of the proximity head 1520 (not shown) or can be mounted on a separate movable arm 1704 that can move independent of the movable arm 1714A that supports the proximity head 1520. As a result, the sensor 1702 can scan and measure corresponding locations near the process being applied to the wafer 1530 by the proximity head 1520. Alternatively, the sensor 1702 can measure corresponding locations near the process being applied to the wafer 1530 by the proximity head 1520 and can independently scan locations on the surface of the wafer substantially simultaneously as the proximity head applies a process to the wafer.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data that can be thereafter be read by a computer system.

Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in FIGS. 4A, 4B and 12 are not required to be performed in the order illustrated, and that all the processing represented by the operations may not be necessary to practice the invention. Further, the processes described in FIGS. 4A, 4B and 12 can also be implemented in software stored in any one of or combinations of computer readable medium.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A plasma etch system comprising:
a broad band light source for illuminating a portion of a surface of a wafer for a plurality of shots;
an optical detector for receiving reflected spectrum data corresponding to a plurality of spectrums of light reflected from the illuminated portion of the surface of the wafer for each of the plurality of shots;
logic for normalizing a first reflected spectrum data corresponding to a first shot;
logic for normalizing a second reflected spectrum data corresponding to a second shot; and
logic for determining an endpoint based on a difference between the normalized first spectrum data and the normalized second spectrum data.

2. The systems of claim 1, wherein the logic for determining the endpoint based on the difference between the normalized first spectrum data and the normalized second spectrum data includes logic for determining a change in the proportions of intensity for at least a portion of the plurality of wavelengths in the first spectra and the second spectra.

3. The system of claim 2, wherein, determining the change in the proportions of intensity for at least a portion of the plurality of wavelengths in the first spectra and the second spectra includes:
logic for converting the normalized first spectrum data into a first vector;
logic for converting the normalized second spectrum data into a second vector;
logic for calculating a distance between the first vector and the second vector;
logic for determining if the distance between the first and second vectors is greater than or equal to a threshold distance; and
logic for identifying a change in the proportions of intensity for at least a portion of the plurality of wavelengths in the first spectra and the second spectra, if the distance between the first and second vectors is greater than or equal to the threshold distance.

4. A system of detecting an endpoint comprising:
a broad band light source for illuminating a portion of a surface of a wafer for a plurality of shots;
an optical detector for receiving reflected spectrum data corresponding to a plurality of spectrums of light reflected from the illuminated portion of the surface of the wafer for each of the plurality of shots;
logic for normalizing a first reflected spectrum data corresponding to a first shot;
logic for normalizing a second reflected spectrum data corresponding to a second shot; and
logic for determining an endpoint based on a difference between the normalized first spectrum data and the normalized second spectrum data.

5. The system of claim 4, wherein the logic for determining the endpoint based on the difference between the normalized first spectrum data and the normalized second spectrum data includes logic for determining a change in the proportions of intensity for at least a portion of the plurality of wavelengths in the first spectra and the second spectra.

6. The system of claim 5, wherein, determining the change in the proportions of intensity for at least a portion of the plurality of wavelengths in the first spectra and the second spectra includes:
logic for converting the normalized first spectrum data into a first vector;
logic for converting the normalized second spectrum data into a second vector;
logic for calculating a distance between the first vector and the second vector;
logic for determining if the distance between the first and second vectors is greater than or equal to a threshold distance; and
logic for identifying a change in the proportions of intensity for at least a portion of the plurality of wavelengths in the first spectra and the second spectra, if the distance between the first and second vectors is greater than or equal to the threshold distance.

7. The system of claim 4, wherein the first spectrum data includes an intensity level corresponding to each of a plurality of wavelengths in the corresponding first spectra.

8. The system of claim 7, wherein the plurality of wavelengths in the corresponding first spectra includes a range of about 300 nm to about 720 nm.

9. The system of claim 8, wherein the plurality of wavelengths in the corresponding first spectra includes a range of about 200 to about 520 individual data points.

10. The system of claim 4, wherein the logic for normalizing the first spectrum data includes logic for substantially removing the corresponding intensity values.

11. The system of claim 10, wherein, the logic for substantially removing the corresponding intensity values includes logic for modifying the intensity values of each one of the plurality of wavelengths such that the sum the intensity values of each one of the plurality of wavelengths is equal to zero the sum of the squares of the intensity values of each one of the plurality of wavelengths is equal to one.

12. The system of claim 4, wherein the system of detecting an endpoint is incorporated in a proximity processing head.

* * * * *